(12) United States Patent
Schiffer et al.

(10) Patent No.: US 9,846,687 B2
(45) Date of Patent: Dec. 19, 2017

(54) WORD CLOUD CANDIDATE MANAGEMENT SYSTEM

(71) Applicant: ADP, LLC, Roseland, NJ (US)

(72) Inventors: Jordan Schiffer, Brooklyn, NY (US); Timothy James McElwee, Metuchen, NJ (US); Keith Wilson Fulton, South Orange, NJ (US)

(73) Assignee: ADP, LLC, Roseland, NJ (US)

( * ) Notice: Subject to any disclaimer, the term of this patent is extended or adjusted under 35 U.S.C. 154(b) by 447 days.

(21) Appl. No.: 14/599,445

(22) Filed: Jan. 16, 2015

(65) Prior Publication Data

US 2016/0026709 A1 Jan. 28, 2016

Related U.S. Application Data

(60) Provisional application No. 62/029,910, filed on Jul. 28, 2014.

(51) Int. Cl.
*G06F 17/30* (2006.01)
*G06F 17/24* (2006.01)
*G06Q 10/06* (2012.01)
*H04L 29/08* (2006.01)
*G06T 11/20* (2006.01)
(Continued)

(52) U.S. Cl.
CPC ............ *G06F 17/24* (2013.01); *G06F 17/212* (2013.01); *G06K 9/00288* (2013.01); *G06K 9/6201* (2013.01); *G06Q 10/06* (2013.01); *G06T 11/206* (2013.01); *G06T 11/60* (2013.01);
(Continued)

(58) Field of Classification Search
None
See application file for complete search history.

(56) References Cited

U.S. PATENT DOCUMENTS 8,275,399 B2 9/2012 Karmarkar et al.
8,799,294 B2 8/2014 Bouillet et al.
(Continued)

FOREIGN PATENT DOCUMENTS

EP 2354983 A1 8/2011

OTHER PUBLICATIONS

"Tag Cloud," Wikimedia Foundation, Inc., last modified Jun. 2014, 9 pages, accessed Jan. 14, 2015. http://en.wikipedia.org/wiki/Tag_cloud.
(Continued)

*Primary Examiner* — Wilson Lee
(74) *Attorney, Agent, or Firm* — Yee & Associates, P.C.

(57) ABSTRACT

A method and apparatus for identifying a relative importance of words in a word cloud. A computer system identifies graphical features and locations for the words representing information in the word cloud based on a group of metrics for the information. The graphical features distinguish the words from each other based on a first number of first values for a first metric in the group of metrics. The locations of the words distinguish the words from each other based on a second number of second values for a second metric in the group of metrics. The word cloud is displayed on a display system using the graphical features and the locations for the words in the word cloud in graphical user interface, which enables identifying the relative importance of the words in the word cloud based on the group of metrics for the information represented by the words.

21 Claims, 17 Drawing Sheets

(51) Int. Cl.
*G06T 11/60* (2006.01)
*G06F 17/21* (2006.01)
*G06K 9/00* (2006.01)
*G06K 9/62* (2006.01)

(52) U.S. Cl.
CPC .......... *H04L 67/1053* (2013.01); *H04L 67/22* (2013.01); *H04L 67/306* (2013.01)

(56) References Cited

U.S. PATENT DOCUMENTS

| | | | | |
|---|---|---|---|---|
| 2010/0057536 | A1* | 3/2010 | Stefik | G06F 17/2785 705/14.71 |
| 2010/0185664 | A1* | 7/2010 | Baggott | G06F 17/3089 707/769 |
| 2012/0260201 | A1 | 10/2012 | Ganesh et al. | |
| 2013/0125008 | A1* | 5/2013 | Irvine | G06F 3/0482 715/739 |
| 2013/0290067 | A1* | 10/2013 | Barton | G06Q 10/06 705/7.28 |
| 2014/0195531 | A1 | 7/2014 | Diament et al. | |
| 2014/0195950 | A1* | 7/2014 | Diament | G06F 17/30958 715/771 |
| 2014/0282244 | A1* | 9/2014 | Speer | G06F 3/04842 715/811 |
| 2015/0095432 | A1* | 4/2015 | Soundararajan | H04L 51/32 709/206 |
| 2015/0206539 | A1* | 7/2015 | Campbell | G10L 15/19 704/251 |
| 2015/0262401 | A1* | 9/2015 | Zes | G06T 11/60 345/636 |
| 2015/0317285 | A1* | 11/2015 | Duggal | G06F 17/211 715/242 |

OTHER PUBLICATIONS

"Say it with a word cloud," UXforthemasses.com, Jun. 2011, 6 pages, accessed Jan. 14, 2015. http://www.uxforthemasses.com/word-clouds/.

* cited by examiner

WORD CLOUD CANDIDATE MANAGEMENT SYSTEM

RELATED PROVISIONAL APPLICATION

This application claims the benefit of U.S. Provisional Patent Application Ser. No. 62/029,910, filed Jul. 28, 2014, and entitled "Dynamic User Interface."

BACKGROUND INFORMATION

1. Field

The present disclosure relates generally to an improved computer system, and in particular, to a method and apparatus for accessing information in a computer system. Still more particularly, the present disclosure relates to a method and apparatus for managing information in a computer system using word clouds.

2. Background

Information systems are used for many different purposes. For example, an information system may be used to process payroll to generate paychecks for employees in an organization. Additionally, an information system also may be used by a human resources department to maintain benefits and other records about employees. For example, a human resources department may manage health insurance, wellness plans, and other programs and organizations using an employee information system. As yet another example, an information system may be used to determine when to hire new employees, assign employees to projects, perform reviews for employees, and other suitable operations for the organization.

Currently used information systems include databases. These databases store information about the organization. More particularly, these databases store information about employees of the organization. One type of information about the employees is values for statistics about the employees. These values are collected and stored in databases. These values may be searched and viewed to perform various operations within an organization. However, this type of information in currently used databases may be cumbersome and difficult to visualize and comprehend. As a result, errors may occur in the analysis of the information and more time than desired may be needed to obtain desired information about the employee from a database in an information system.

In some cases, spreadsheets may be created to aid in the analysis of information about employees. Information from a database may be exported to a spreadsheet, and a user may enter or modify the information in the spreadsheet. Using a spreadsheet to review and analyze information may be easier than reviewing results from database queries. The analysis of the information using spreadsheets, however, may still be more difficult and cumbersome than desired.

Therefore, it would be desirable to have a method and apparatus that take into account at least some of the issues discussed above, as well as other possible issues. For example, it would be desirable to have a method and apparatus that overcome issues with analyzing information for employees in a database.

SUMMARY

An illustrative embodiment of the present disclosure provides a method for identifying a relative importance of words in a word cloud. A computer system identifies graphical features and locations for the words representing information in the word cloud based on a group of metrics for the information. The graphical features distinguish the words from each other based on a first number of first values for a first metric in the group of metrics. The locations of the words distinguish the words from each other based on a second number of second values for a second metric in the group of metrics. The computer system displays the word cloud on a display system using the graphical features and the locations for the words in the word cloud in a graphical user interface. The graphical user interface enables identifying the relative importance of the words in the word cloud based on the group of metrics for the information represented by the words.

Another illustrative embodiment of the present disclosure provides a computer system comprising a display system and a word cloud system. The word cloud system is in communication with the display system. The word cloud system identifies graphical features and locations for words representing information in a word cloud based on a group of metrics for the information. The graphical features distinguish the words from each other based on a first number of first values for a first metric in the group of metrics. The locations of the words distinguish the words from each other based on a second number of second values for a second metric in the group of metrics. The word cloud is displayed on the display system using the graphical features and the locations for the words in the word cloud in a graphical user interface. The graphical user interface enables identifying a relative importance of the words in the word cloud based on the group of metrics for the information represented by the words.

Yet another illustrative embodiment provides a computer program product for identifying a relative importance of words in a word cloud. The computer program product comprises a computer readable storage media, first program code, and second program code. The first program code, stored on the computer readable storage media, identifies graphical features and locations for the words representing information in the word cloud based on a group of metrics for the information. The graphical features distinguish the words from each other based on a first number of first values for a first metric in the group of metrics. The locations of the words distinguish the words from each other based on a second number of second values for a second metric in the group of metrics. The second program code, stored on the computer readable storage media, displays the word cloud on a display system using the graphical features and the locations for the words in the word cloud in a graphical user interface. The graphical user interface enables identifying the relative importance of the words in the word cloud based on the group of metrics for the information represented by the words.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that in assigning employees of an organization to projects, various types of information about the employees may be used to identify who is most suited for different projects. The information may include, for example, levels of particular skills or experience that are desired for a project that may be considered to identify employees for the project.

The illustrative embodiments recognize and take into account that the spreadsheets that may be used to make assignments may include values for information about employees of an organization. The illustrative embodiments recognize and take into account that this format of the spreadsheets may be more difficult to understand than desired. The illustrative embodiments also recognize and take into account that changing the information about employees may be more difficult than desired.

The illustrative embodiments further recognize and take into account that when word clouds are used to present information about employees of an organization, the word clouds may be more difficult to read than desired. The illustrative embodiments still further recognize and take into account that colors, fonts, and sizes of words in word clouds can be used to show values for metrics about employees. The illustrative embodiments also recognize and take into account that using word clouds to represent values for metrics about employees may be more difficult than desired.

Thus, the illustrative embodiments provide a method and apparatus for accessing information in an information system using word clouds. For example, a method and apparatus may be present for identifying a relative importance of words in a word cloud. A computer system identifies graphical features and locations for the words representing information in the word cloud based on a group of metrics for the information. The graphical features distinguish the words from each other based on a first number of first values for a first metric in the group of metrics. The locations of the words distinguish the words from each other based on a second number of values for a second metric in the group of metrics. The computer system displays the word cloud on a display system using the graphical features and locations for the words in the word cloud in graphical user interface. The graphical user interface enables identifying the relative importance of the words in the word cloud based on the group of metrics for the information represented by the words.

Figure 1:
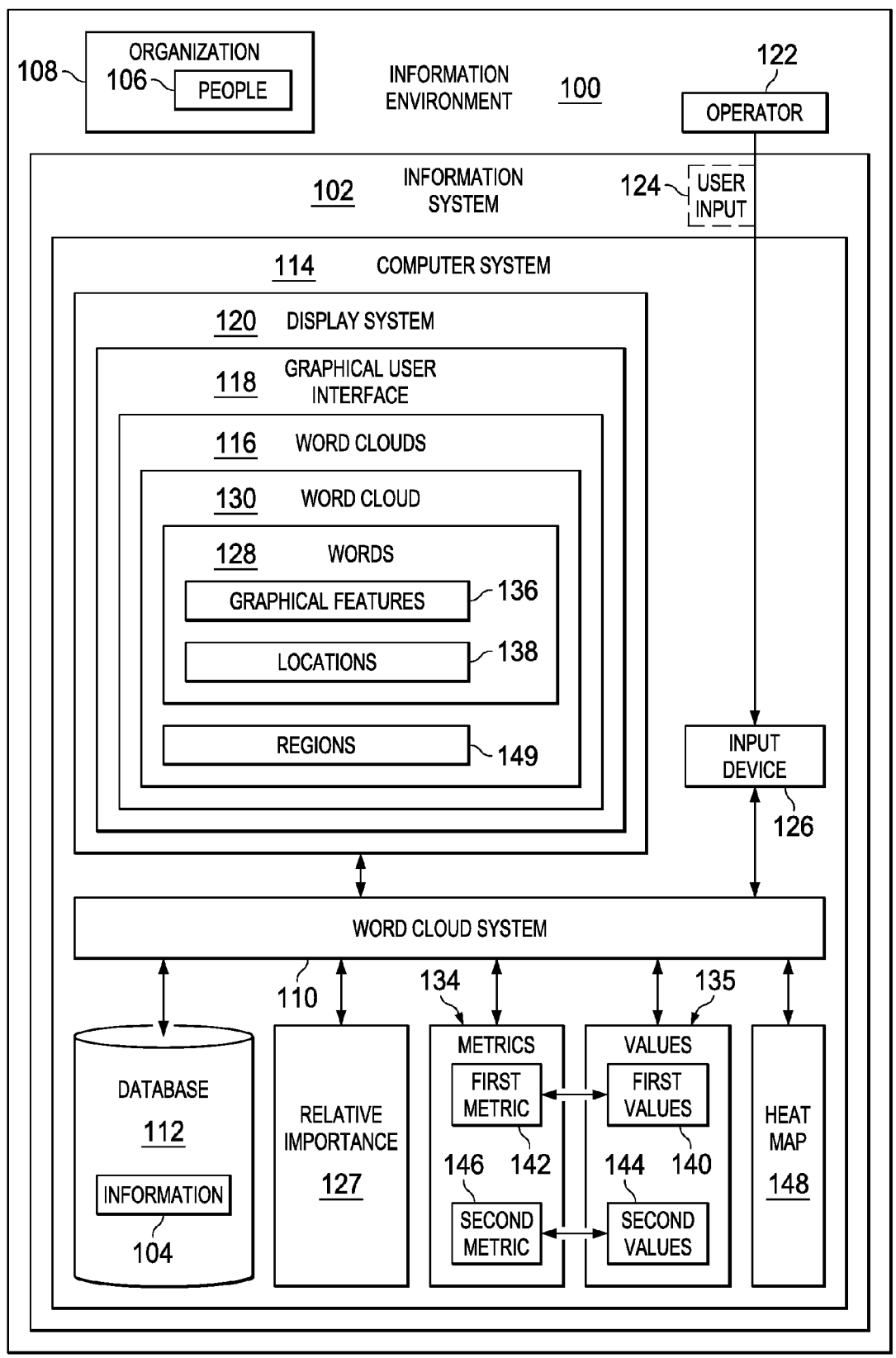
FIG. 1 is an illustration of a block diagram of an information environment in accordance with an illustrative embodiment.

With reference now to the figures, and in particular, with reference to FIG. 1, an illustration of a block diagram of an information environment is depicted in accordance with an illustrative embodiment. In this illustrative example, information environment 100 includes information system 102. Information system 102 manages information 104 about people 106 in organization 108.

Organization 108 may be, for example, a corporation, a partnership, a charitable organization, a city, a government agency, or some other suitable type of organization. People 106 may be employees of organization 108. In other illustrative examples, people 106 may be members of organization 108, without being employees. Information system 102 may be an employee information system or some other type of information system that stores and provides access to information 104 about people 106.

In this illustrative example, information system 102 includes different components. As depicted, information system 102 includes word cloud system 110 and database 112. Word cloud system 110 and database 112 may be implemented in computer system 114.

As depicted, word cloud system 110 provides access to information 104 using a group of word clouds 116 displayed in graphical user interface 118 in display system 120 in computer system 114. As used herein, "a group of," when used with reference to items, means one or more items. For example, "a group of word clouds 116" is one or more of word clouds 116.

In the illustrative example, word cloud system 110 may be implemented in software, hardware, firmware, or a combination thereof. When software is used, the operations performed by word cloud system 110 may be implemented in program code configured to run on hardware, such as a processor unit. When firmware is used, the operations performed by word cloud system 110 may be implemented in program code and data and stored in persistent memory to run on a processor unit. When hardware is employed, the hardware may include circuits that operate to perform the operations in word cloud system 110.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Computer system 114 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

As depicted, display system 120 is a hardware system and includes one or more display devices on which graphical user interface 118 may be displayed. Operator 122 may interact with graphical user interface 118 through user input 124 generated by input device 126 in computer system 114. Input device 126 may be, for example, a mouse, a keyboard, a trackball, a touchscreen, a stylus, or some other suitable type of input device.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, word cloud system 110 provides access to information 104 in different forms. For example, the access may be selected from at least one of reading, writing, or modifying information 104. As depicted, this access is facilitated through the use of the group of word clouds 116.

In one illustrative example, word cloud system 110 may facilitate identifying relative importance 127 of words 128 in word cloud 130 in the group of word clouds 116. As depicted, relative importance 127 is how important one word in words 128 compares to another word in words 128. Relative importance 127 may be measured using metrics 134 for information 104. In turn, metrics 134 may be represented using words 128 in word cloud 130.

For example, word cloud system 110 may identify words 128 from information 104 using metrics 134. Words 128 may actually be words in information 104 or may be selected to be associated with particular pieces of information 104.

In this illustrative example, metrics 134 are variables, and metrics 134 have values 135. Values 135 may be used to identify relative importance 127 of words 128.

As depicted, metrics 134 may take various forms. For example, metrics 134 may include at least one of a measure of time associated with words 128, a level of mastery associated with words 128, a number of times words 128 are located in information 104, a priority of organization 108 associated with words 128, a monetary value to organization 108 associated with words 128, or other suitable types of variables for relative importance 127 of words 128.

As used herein, "a number of," when used with reference to items, means one or more items. For example, "a number of times" is one or more of times.

As depicted, word cloud system 110 in computer system 114 identifies graphical features 136 and locations 138 for words 128 representing information 104 in word cloud 130 based on metrics 134 for information 104. Graphical features 136 may be selected from at least one of a size, a color, a font, or other graphical feature for words 128. Locations 138 are where words 128 are displayed in word cloud 130 relative to each other.

In this particular example, graphical features 136 distinguish words 128 from each other based on a first number of first values 140 in values 135 for first metric 142 in the group of metrics 134, and locations 138 of words 128 distinguish words 128 from each other based on a second number of second values 144 in values 135 for second metric 146 in the group of metrics 134.

In the illustrative example, word cloud system 110 in computer system 114 displays word cloud 130 on display system 120 using graphical features 136 and locations 138 for words 128 in word cloud 130 in graphical user interface 118. As depicted, graphical user interface 118 enables identifying relative importance 127 of words 128 in word cloud 130 based on metrics 134 for information 104 represented by words 128.

In this illustrative example, user input 124 may be received to change at least one of a graphical feature in graphical features 136 or a location in locations 138 for a word in words 128 in word cloud 130. User input 124 enables a desired level of user interaction for operator 122 for distinguishing words 128 from each other based on values 135 for a group of metrics 134 for words 128.

As depicted, heat map 148 may be used in displaying words 128 in word cloud 130 in graphical user interface 118. In this illustrative example, heat map 148 is a graphical indicator for regions 149 of word cloud 130 that identifies relative importance 127 of words 128.

In one illustrative example, heat map 148 may be displayed on word cloud 130. For example, heat map 148 may be displayed in the background with respect to words 128. In other words, words 128 may be overlaid on heat map 148. In another example, heat map 148 may be displayed on words 128. In this example, heat map 148 may have transparency that allows words 128 to be seen through heat map 148.

In another illustrative example, heat map 148 may not be displayed in graphical user interface 118 as part of the display of words 128 in word cloud 130. For example, heat map 148 may be used to identify at least one of graphical features 136 or locations 138 for words 128. For example, graphical features 136 may include color in which color reflects heat map 148. Additionally, locations 138 may be selected such that words 128 having the same color are displayed in proximity to each other in word cloud 130 on graphical user interface 118.

In this manner, word cloud system 110 provides a visualization of information 104 about people 106. This visualization is provided through the display of a group of word clouds 116 in graphical user interface 118. Additionally, word cloud system 110 enables operator 122 to interact with the group of word clouds 116. This interaction allows for at least one of reading, writing, or modifying information 104.

As a result, computer system 114 operates as a special purpose computer system in which word cloud system 110 in computer system 114 enables accessing information 104 about people 106. In particular, word cloud system 110 transforms computer system 114 into a special purpose computer system as compared to currently available general computer systems that do not have word cloud system 110.

For example, word cloud system 110 provides a visualization of information 104 in graphical user interface 118. This visualization is much more than merely displaying values 135 for metrics 134 that may be in information 104. For example, the visualization includes words 128 in word cloud 130. Words 128 have graphical features 136 and locations 138. These characteristics of words 128 provide for a visualization of information 104 which enables operator 122 to more quickly comprehend information 104.

Further, word cloud 130 in graphical user interface 118 may be manipulated through user input 124 to change information 104 in database 112. Graphical user interface 118 facilitates the manipulation of words 128 in a manner that increases the ease at which information 104 may be changed in database 112.

Computer system 114 performs a transformation of information 104. Information 104 stored in database 112 changes such that information 104 has a different function or has a different use. For example, information 104 is stored in database 112 in the form of records. Information 104 is transformed into words that are graphically displayed in computer system 114. In particular, the words have graphical elements and locations that provide for a visualization of information 104 in a manner that increases at least one of the ease or speed at which operator 122 may comprehend information 104 as compared to currently used information systems.

Figure 2:
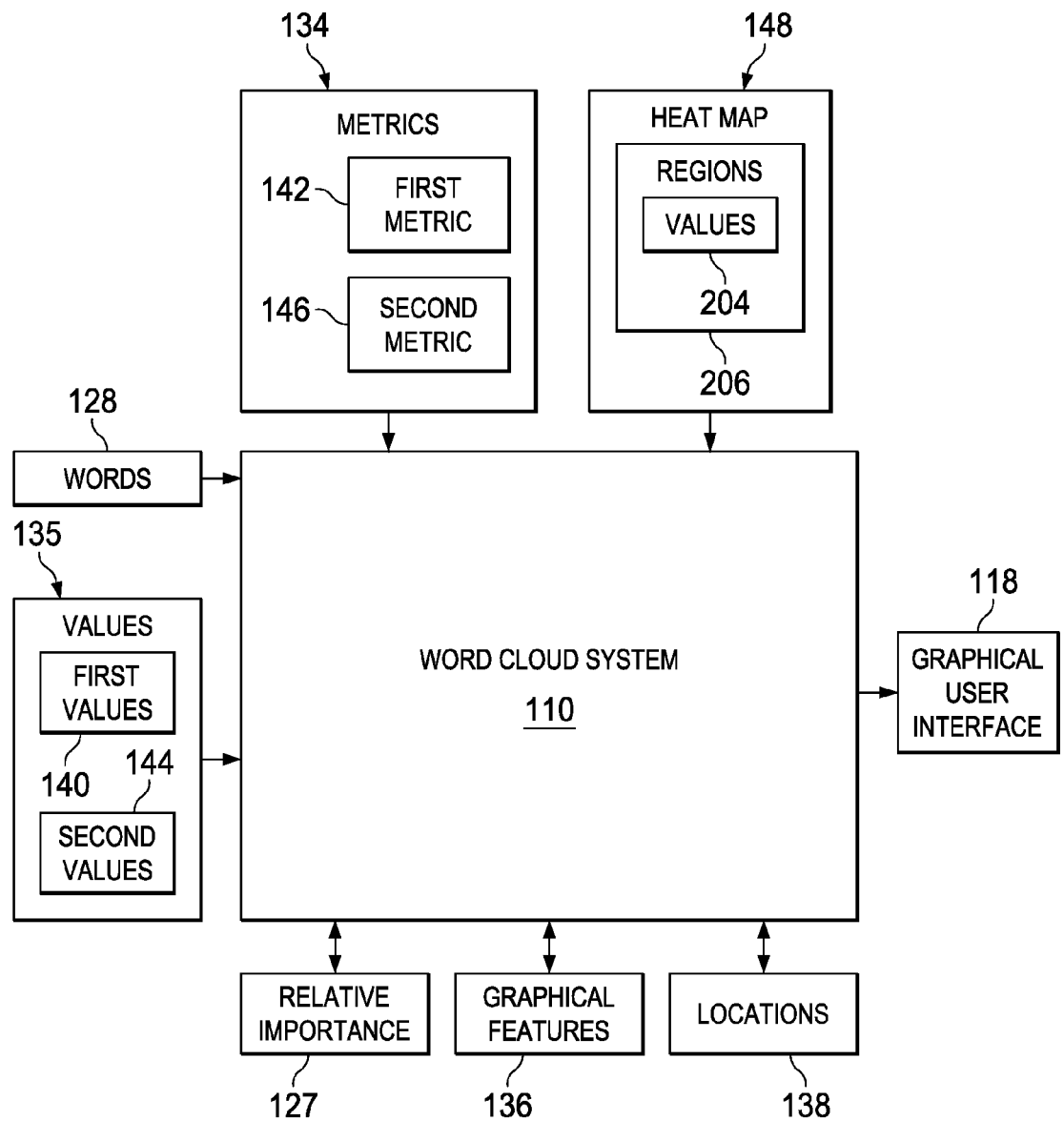
FIG. 2 is an illustration of a block diagram of information flow for accessing word clouds in accordance with an illustrative embodiment.

Turning now to FIG. 2, an illustration of a block diagram of information flow for accessing word clouds is depicted in accordance with an illustrative embodiment. The information flow depicted in FIG. 2 is implemented by word cloud system 110.

In this illustrative example, word cloud system 110 identifies relative importance 127 of words 128 using values 135. In the illustrative example, word cloud system 110 identifies relative importance 127 between words 128 based on first values 140 for first metric 142 for words 128. In the illustrative example, word cloud system 110 identifies graphical features 136 for words 128 for graphical user interface 118 based on first values 140. For example, word cloud system 110 may identify a first word in words 128 with a highest value in first values 140 as having a higher relative importance 127. In this example, word cloud system 110 may identify a graphical feature for the first word in words 128 that distinguishes the first word from other words in words 128 based on the higher relative importance 127 for the first word.

In this illustrative example, words 128 represent types of work experience of people 106 of organization 108 in FIG. 1. First values 140 for first metric 142 for words 128 may represent levels of mastery for the types of work experience, in this illustrative example. For example, first values 140 may be between a range of 0 to 10 with 10 indicating the highest level of mastery and 0 indicating no mastery. In this illustrative example, the values may also be at least one of high, medium, or low; true or false; percentages; or other suitable types of ranges of values. For example, the levels of mastery may indicate how well a person is able to perform a task, a job, a step, or some other operation or function for a type of work experience.

As depicted, word cloud system 110 also identifies relative importance 127 between words 128 based on second values 144 for second metric 146 for words 128. Word cloud system 110 identifies locations 138 for words 128 on heat map 148 for display on graphical user interface 118. Word cloud system 110 identifies locations 138 for words 128 based on second values 144. In this illustrative example, second values 144 for second metric 146 for words 128 may represent years spent demonstrating the types of experience.

In the illustrative example, word cloud system 110 identifies locations 138 of words 128 for display on heat map 148 based on values 204 for regions 206 of heat map 148. In other words, word cloud system 110 selects locations 138 of words 128 to values 204 of regions 206 on heat map 148 based on second values 144 for second metric 146 for words 128.

In this illustrative example, word cloud system 110 displays words 128 at locations 138 on heat map 148 in graphical user interface 118 using graphical features 136 for words 128. Thus, word cloud system 110 presents metrics 134 for words 128 in word cloud 130 on heat map 148 in graphical user interface 118.

Figure 3:
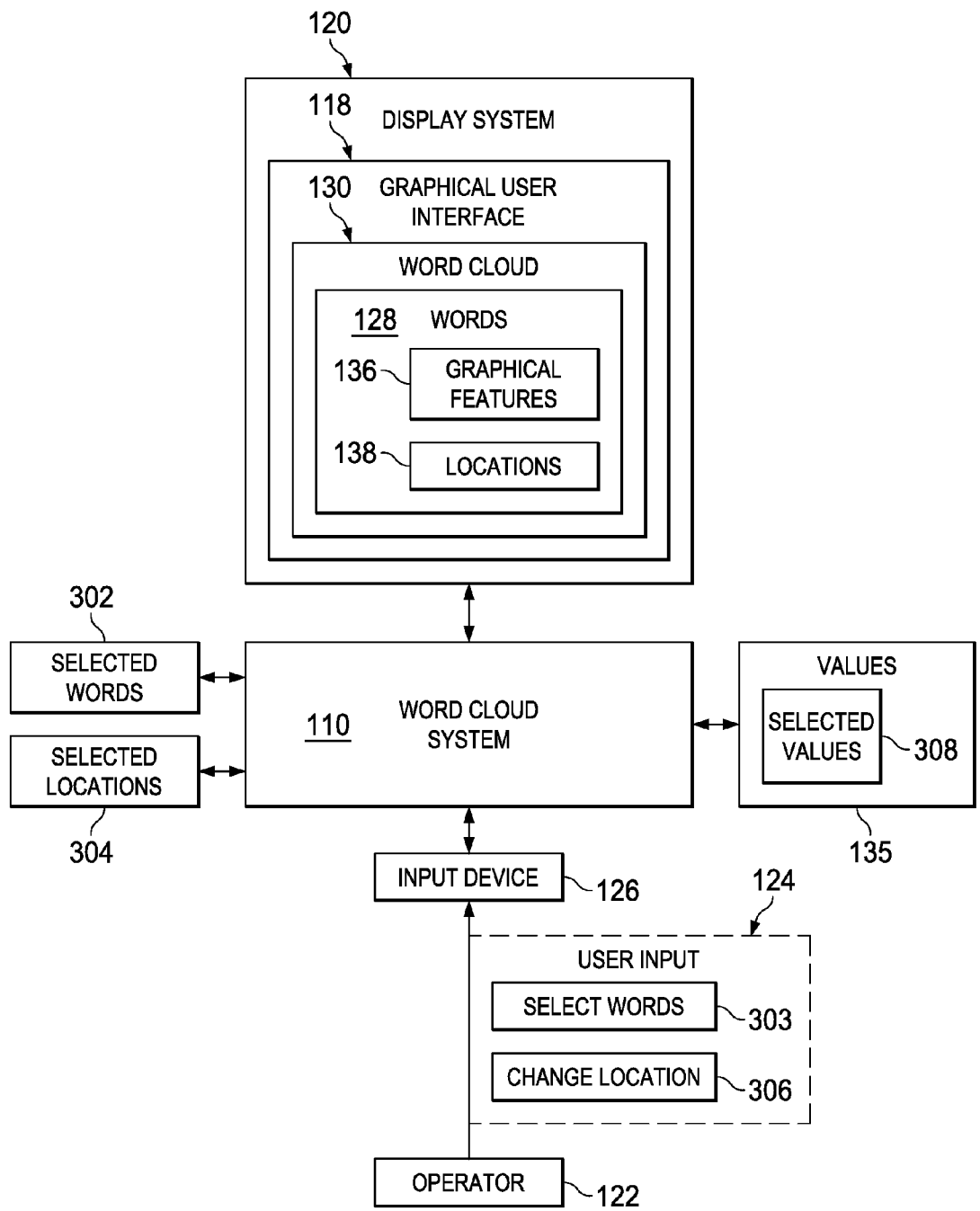
FIG. 3 is an illustration of a block diagram illustrating information flow for an operator interacting with a word cloud in accordance with an illustrative embodiment.

With reference now to FIG. 3, an illustration of a block diagram illustrating information flow for an operator interacting with a word cloud is depicted in accordance with an illustrative embodiment. In this illustrative example, word cloud system 110 receives user input 124 from operator 122. User input 124 is made to word cloud 130 displayed in graphical user interface 118 in display system 120 through input device 126. User input 124 manipulates word cloud 130 displayed in graphical user interface 118.

In this illustrative example, word cloud system 110 identifies a group of selected words 302 from words 128 based on user input 124 to select words 303. For example, user input 124 to select words 303 may include operator 122 selecting the group of selected words 302 by holding down a shift key of a keyboard while selecting the group of selected words 302 with a mouse.

As depicted, word cloud system 110 identifies a group of selected locations 304 for the group of selected words 302 based on user input 124 to change location 306 of the group of selected words 302. In this illustrative example, word cloud system 110 then identifies a group of selected values 308 for the group of selected words 302 based on the group of selected locations 304.

Figure 4:
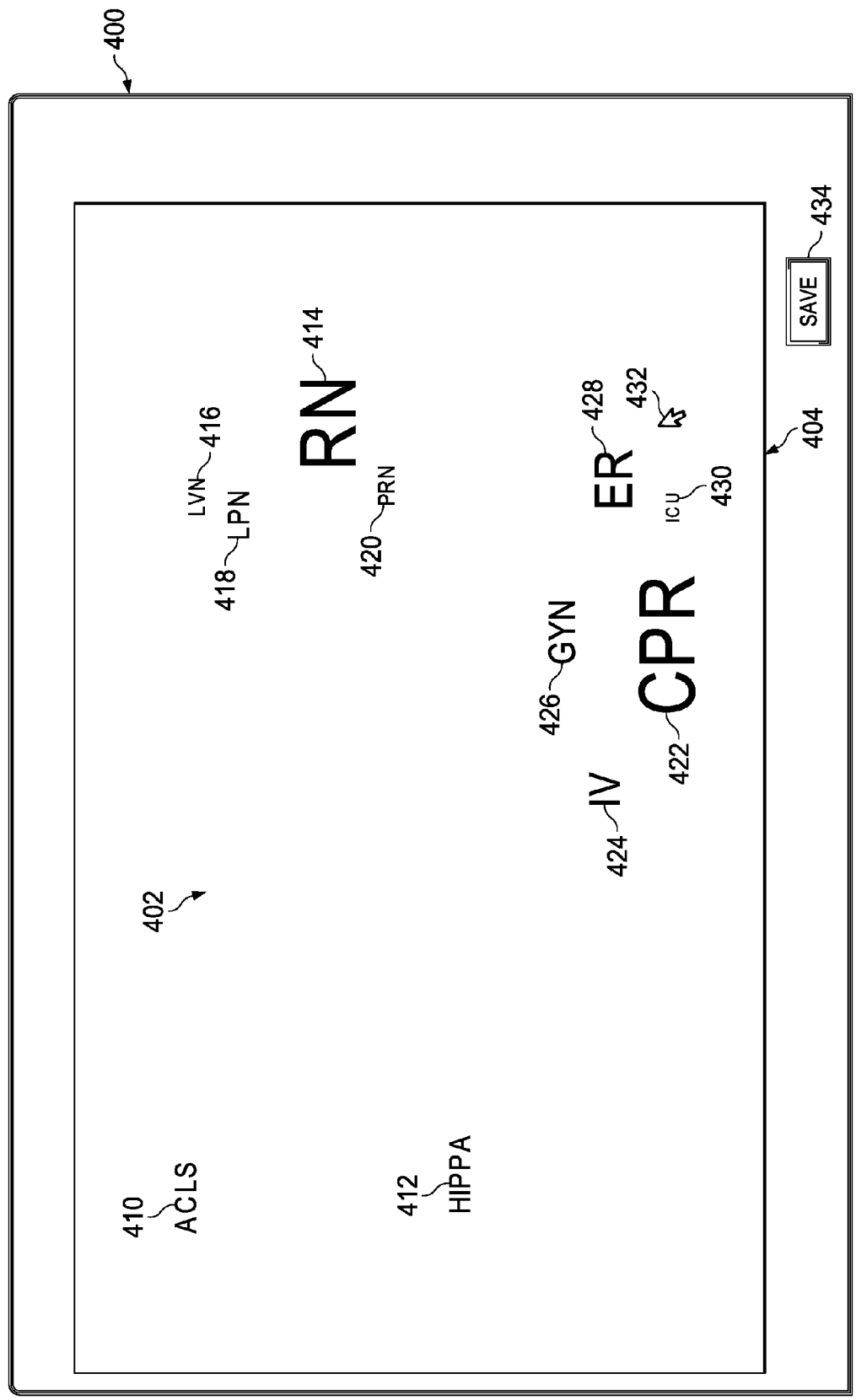
FIG. 4 is an illustration of a graphical user interface with a word cloud in accordance with an illustrative embodiment.

FIGS. 4-12 are illustrative examples of a graphical user interface that may be used to interact with a word cloud system to access values of metrics for people through word clouds. With reference first to FIG. 4, an illustration of a graphical user interface with a word cloud is depicted in accordance with an illustrative embodiment. Graphical user interface 400 is an example of one implementation for graphical user interface 118 shown in block form in FIG. 1.

In this illustrative example, words 402 are graphically displayed in word cloud 404. In this illustrative example, words 402 in word cloud 404 represent different types of work experience for a person. Graphical features and locations of words 402 in word cloud 404 represent values for metrics for the different types of work experience. As depicted, the size of words 402 displayed on graphical user interface 400 is the graphical feature of words 402 that represent values for a metric for the different types of work experience.

In the illustrative example, the values for metrics are for at least one of actual experience, desired experience, or potential experience. These values may be at least one of a measure of time demonstrating a type of work experience, a level of mastery for a type of work experience, or other suitable types of values for a type of work experience. These values may be at least one of self-identified, supervisor identified, test result identified, or identified through other suitable ways of identifying values for metrics for different types of experience.

As depicted, words 402 include acronyms of phrases for different types of experience that a nurse might possess. In the illustrative example, words 402 include ACLS 410, HIPPA 412, RN 414, LVN 416, LPN 418, PRN 420, CPR 422, IV 424, GYN 426, ER 428, and ICU 430. ACLS 410 is experience in the area of advanced cardiac life support and HIPPA 412 is experience with the health insurance portability and accountability act. In this illustrative example, RN 414 is experience as a registered nurse, LVN 416 is experience as a licensed vocational nurse, LPN 418 is experience as a licensed practical nurse, and PRN 420 is experience as a per diem nurse. CPR 422 is experience in the area of cardiopulmonary resuscitation, IV 424 is experience in the area of intravenous therapy, GYN 426 is experience in the area of gynecology, ER 428 is experience in an emergency room, and ICU 430 is experience in an intensive care unit.

In the illustrative example, locations of words 402 may be changed to change values for skills represented by words 402 using pointer 432. Pointer 432 may be moved using an input device controlled by an operator.

As depicted, changes may be saved using save button 434. Selecting save button 434 causes changes made in graphical user interface 400 to be saved in a database. In particular, changes to the locations of one or more of words 402 indicated by pointer 432 causes changes in the values for those skills. These changed values are saved to the database when save button 434 is pushed by the operator.

Figure 5:
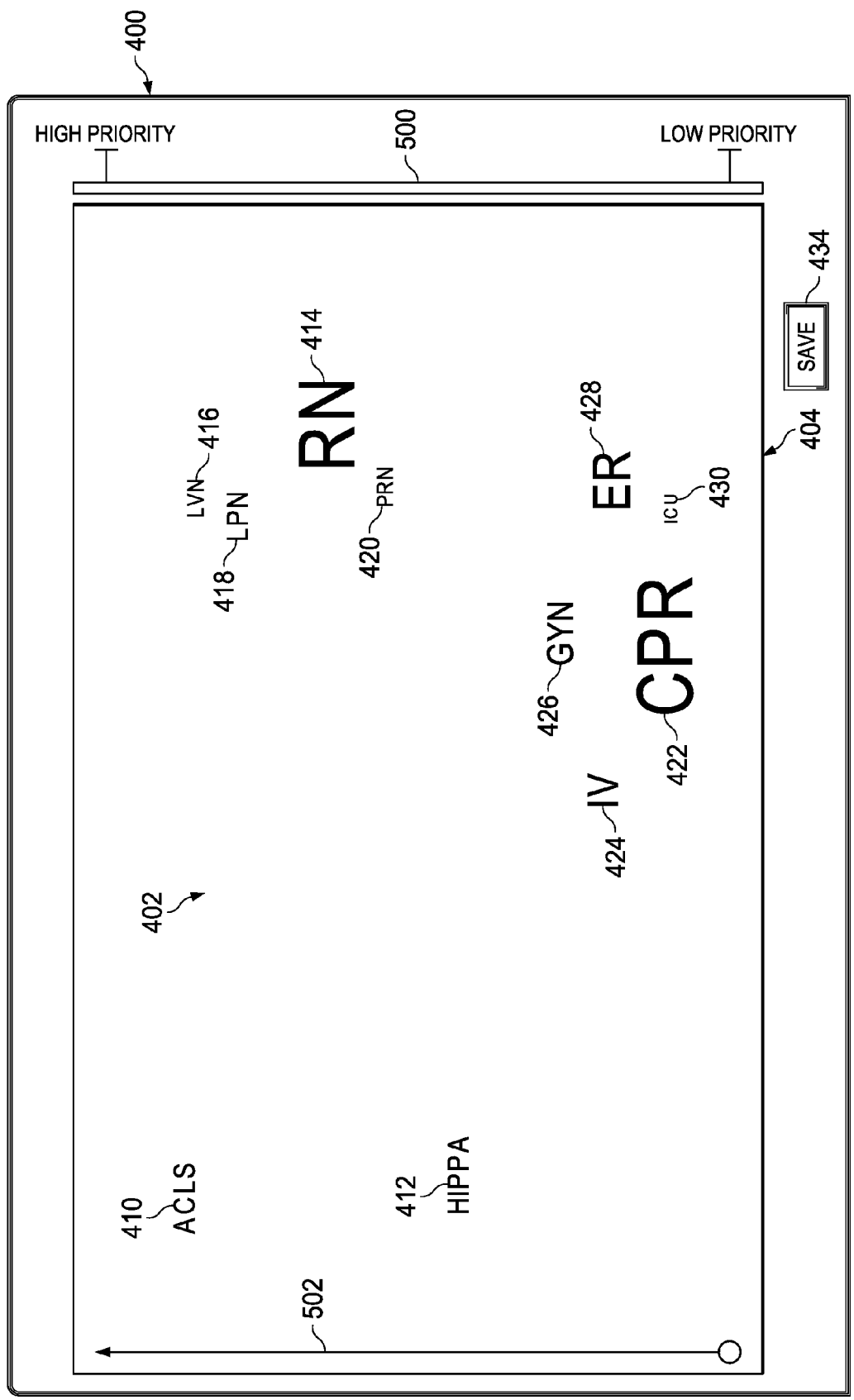
FIG. 5 is an illustration of a graphical user interface displaying metrics for a word cloud in accordance with an illustrative embodiment.

Turning next to FIG. 5, an illustration of a graphical user interface displaying metrics for a word cloud is depicted in accordance with an illustrative embodiment. In this illustrative example, indicator 500 is displayed in graphical user interface 400. Indicator 500 represents a metric for a priority of an organization for different types of work experience for a person.

As depicted, the size of words 402 indicates first values of a first metric for types of work experience possessed by the person. In this illustrative example, the first values for the first metric are current levels of skill for the types of work experience represented by words 402.

In this illustrative example, vertical locations may be present for words 402 in word cloud 404 in the direction of arrow 502. As depicted, the vertical locations of words 402 in word cloud 404 along arrow 502 indicate second values for the types of work experience based on the metric for priority of the organization. For example, the second values for the types of work experience represented by words 402 may be a current priority of the organization for the types of work experience represented by words 402. In this example, the types of work experience in words 402 that have high priority values are located above the types of work experience in words 402 with low priority values.

Figure 6:
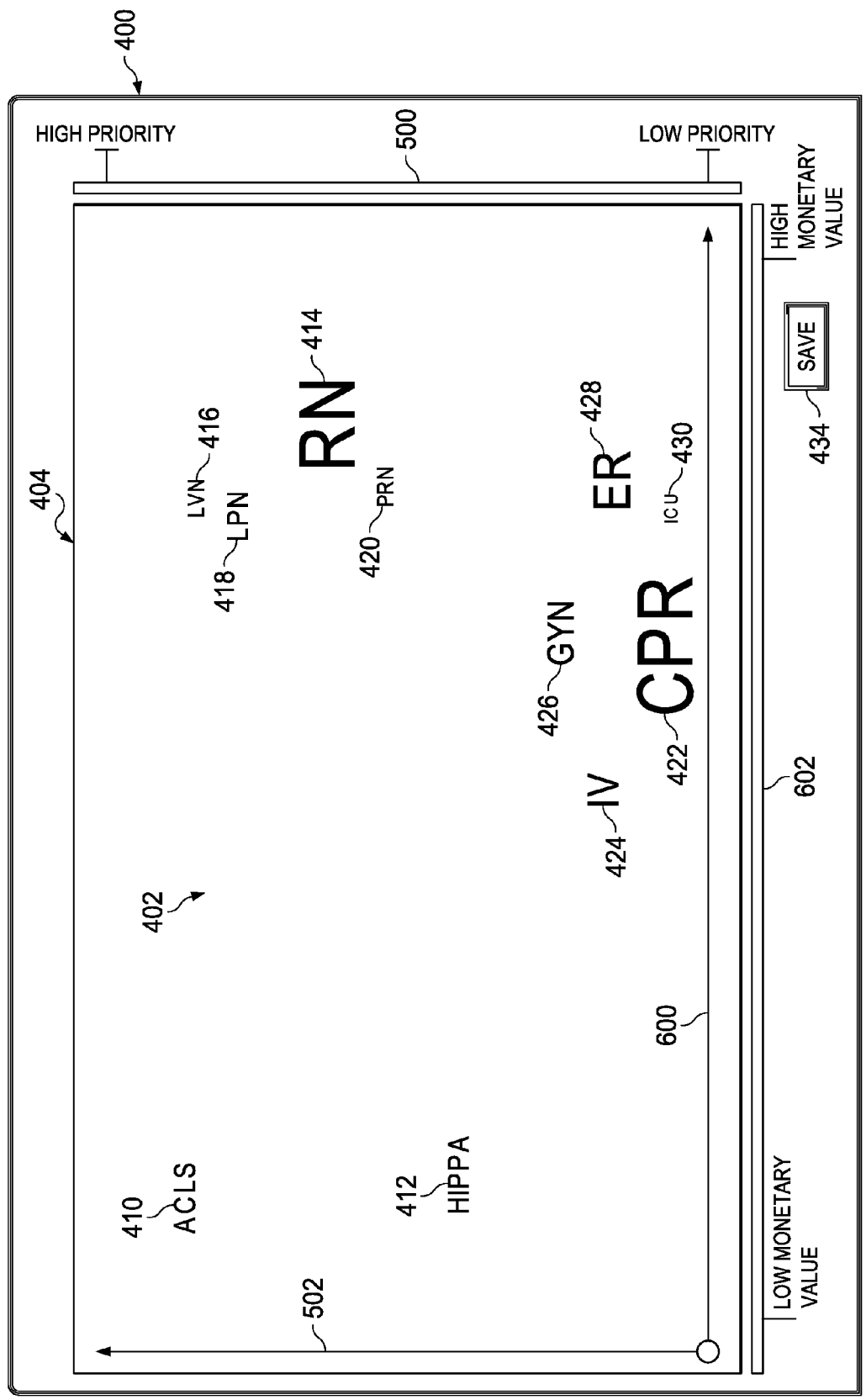
FIG. 6 is an illustration of a graphical user interface displaying metrics for a word cloud in accordance with an illustrative embodiment.

Referring now to FIG. 6, an illustration of a graphical user interface displaying metrics for a word cloud is depicted in accordance with an illustrative embodiment. In this illustrative example, words 402 are arranged horizontally in the direction of arrow 600 to represent a metric for monetary value of an organization for different types of work experience for a person.

As depicted, the size of words 402 indicates first values for words 402 for a first metric, the vertical locations of words 402 indicate second values for words 402 for the metric for priority of the organization, and the horizontal locations of words 402 in word cloud 404 indicate values for words 402 based on the metric for monetary value of the organization. In this illustrative example, indicator 602 is displayed in graphical user interface 400 and represents the metric for priority of the organization.

For example, the values for the types of work experience represented by words 402 based on the metric for monetary value of the organization may be a current monetary value of the organization for the different types of work experience represented by words 402. In this example, the types of work experience in words 402 that have high monetary values are located to the right of the types of work experience in words 402 with low monetary values.

In this illustrative example, ER 428 has a higher monetary value to the organization than HIPPA 412. Thus, experience in the emergency room has a higher relative importance for the organization as compared to experience with the health insurance portability and accountability act.

Figure 7:
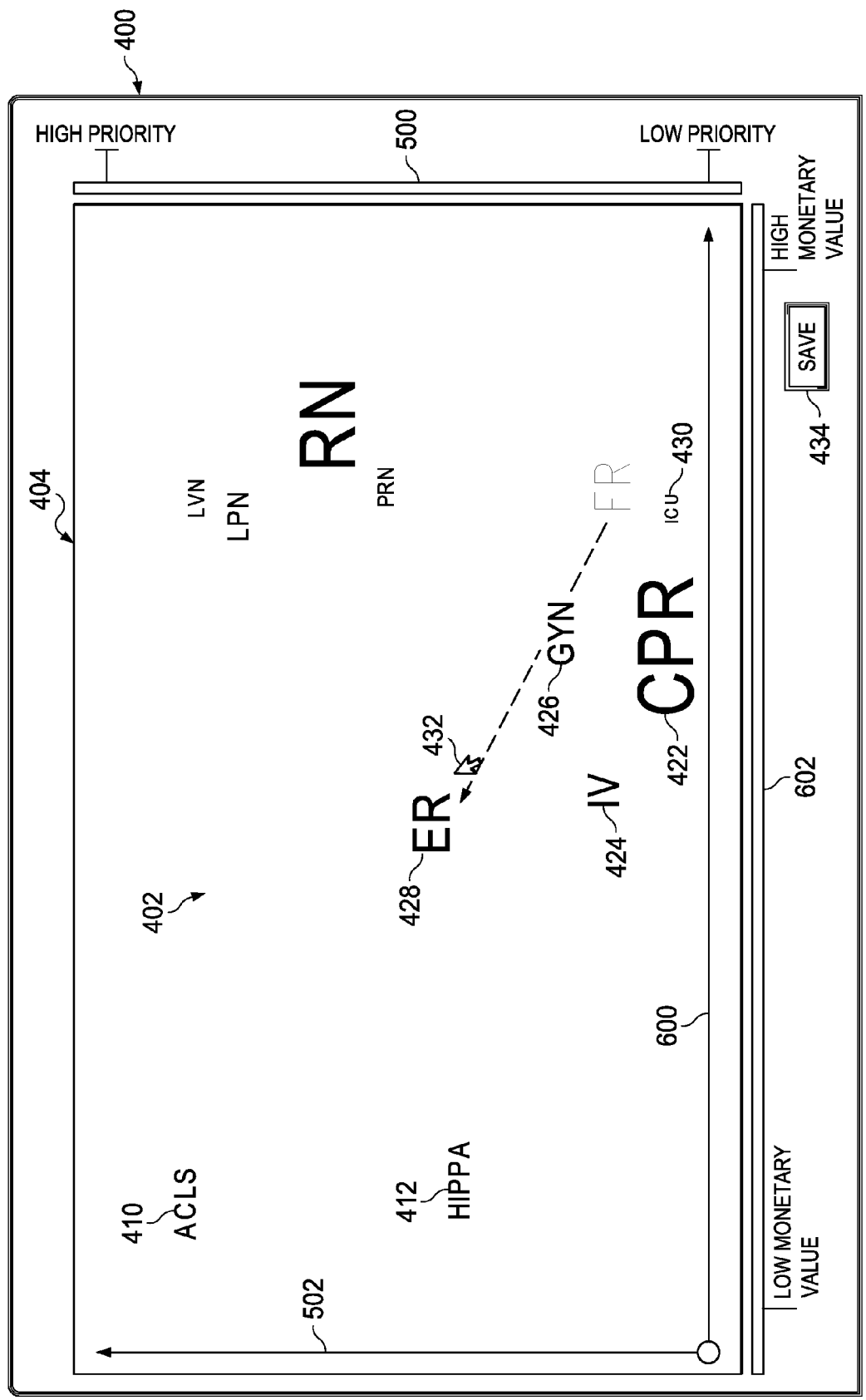
FIG. 7 is an illustration of a graphical user interface for modifying values of metrics for a word in a word cloud in accordance with an illustrative embodiment.

With reference to FIG. 7, an illustration of a graphical user interface for modifying values of metrics for a word in a word cloud is depicted in accordance with an illustrative embodiment. In this illustrative example, ER 428 is a word in words 402 selected using pointer 432 controlled by an operator.

As depicted, the vertical location of ER 428 indicates a value for ER 428 for the metric for priority of the organization and the horizontal location of ER 428 in word cloud 404 indicates a value for ER 428 for the metric for monetary value of the organization.

In this illustrative example, the operator has moved ER 428 to a new location on word cloud 404. As depicted, in moving ER 428 to a new location on word cloud 404, the operator has changed the value of ER 428 for the metric for priority of the organization to a higher priority and the value of ER 428 for the metric for monetary value of the organization to a lower monetary value.

Figure 8:
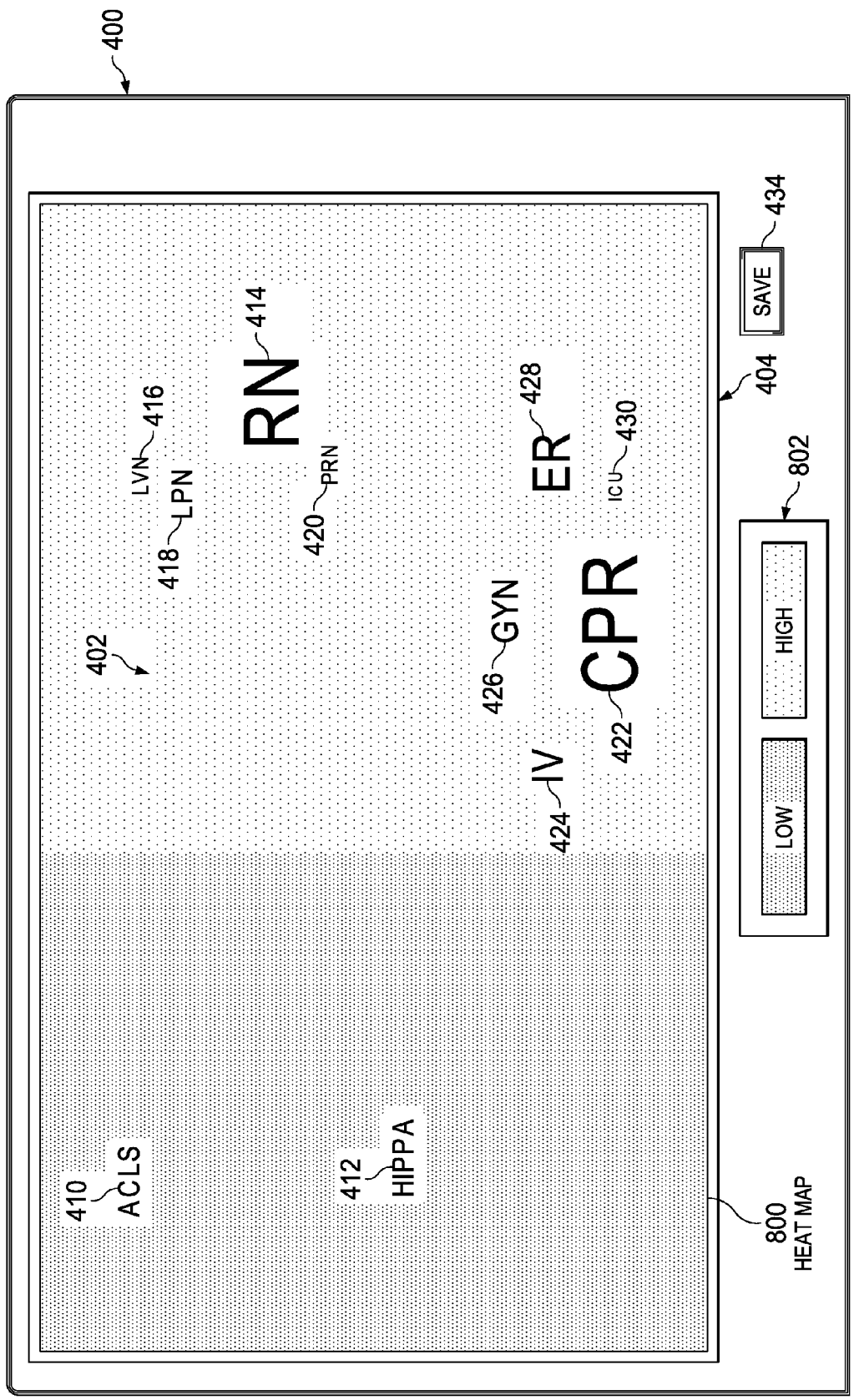
FIG. 8 is an illustration of a graphical user interface displaying a heat map for a word cloud in accordance with an illustrative embodiment.

With reference now to FIG. 8, an illustration of a graphical user interface displaying a heat map for a word cloud is depicted in accordance with an illustrative embodiment. In this illustrative example, heat map 800 is a graphical indicator of priority for a group of organizations for different types of work experience for a person.

As depicted, the size of words 402 indicates first values of a first metric for the types of work experience represented by words 402. In this illustrative example, locations of words 402 in word cloud 404 indicate second values for a second metric for the different types of work experience.

In the illustrative example, heat map 800 has a first rectangular region for types of work experience having a high level of priority for the group of organizations, and a second rectangular region for types of work experience with low level of priority for the group of organizations. As depicted, graphical user interface 400 includes legend 802. In this illustrative example, legend 802 describes the regions of heat map 800. In this illustrative example, the region in heat map 800 having the higher level of priority is shaded in light gray and the region in heat map 800 having the lower level of priority is shaded in dark gray. As depicted, graphical user interface 400 has displayed heat map 800 over word cloud 404 using translucency.

For example, the second values for the different types of work experience represented by words 402 may be a current priority of the group of organizations for the types of work experience represented by words 402. In this example, the types of work experience in words 402 that have high priority values are located in the high region of heat map 800, and the types of work experience in words 128 with low priority values are located in the low region of heat map 800.

Figure 9:
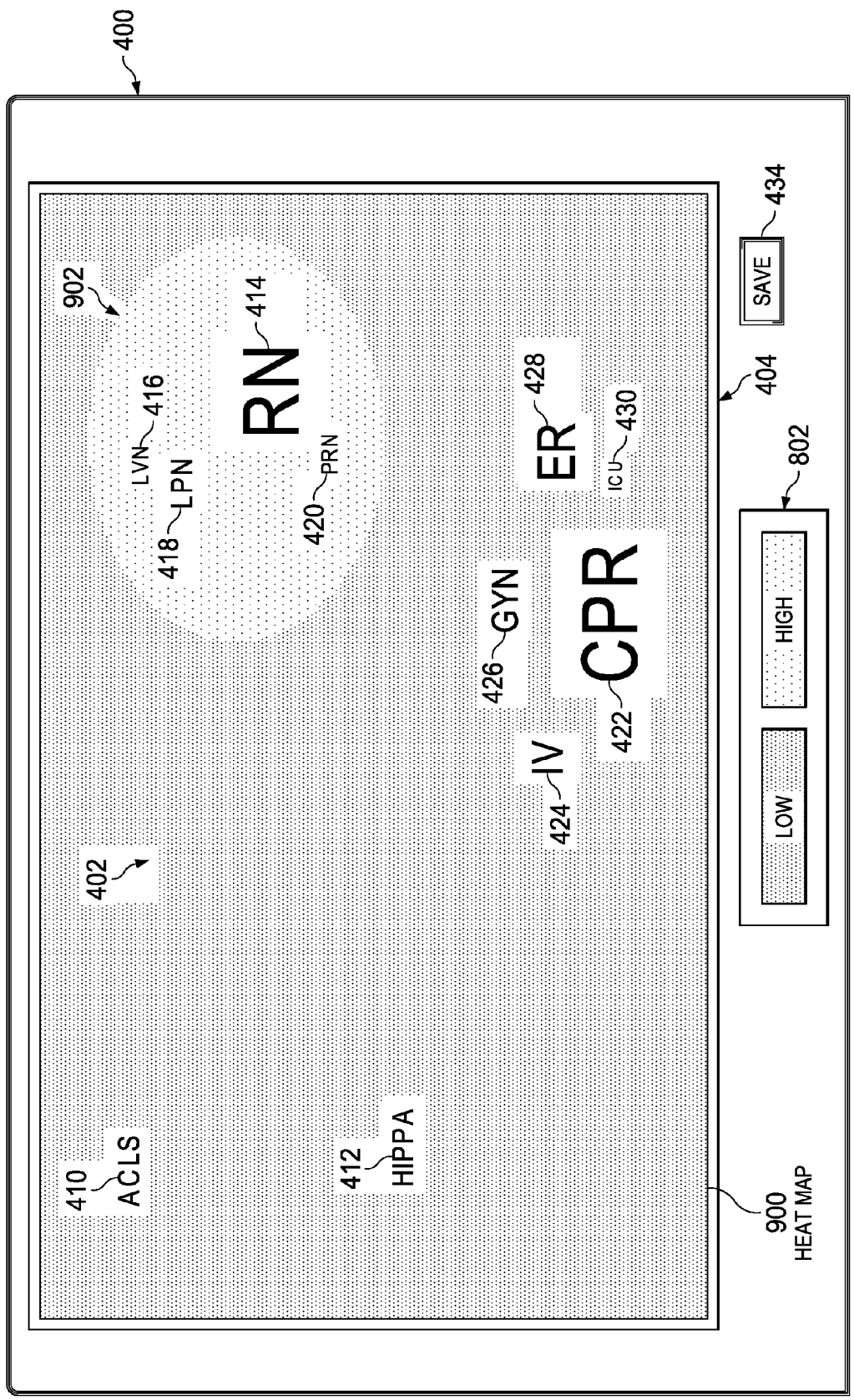
FIG. 9 is an illustration of a graphical user interface displaying a heat map for a word cloud in accordance with an illustrative embodiment.

With reference next to FIG. 9, an illustration of a graphical user interface displaying a heat map for a word cloud is depicted in accordance with an illustrative embodiment. In this illustrative example, heat map 900 is a graphical indicator of priority for an organization for different types of work experience for a person.

As depicted, heat map 900 has elliptical region 902 for types of work experience having a high level of priority for the organization, and a rectangular region for types of work experience with low level of priority. In this illustrative example, graphical user interface 400 has displayed words 402 of word cloud 404 on top of heat map 900.

Figure 10:
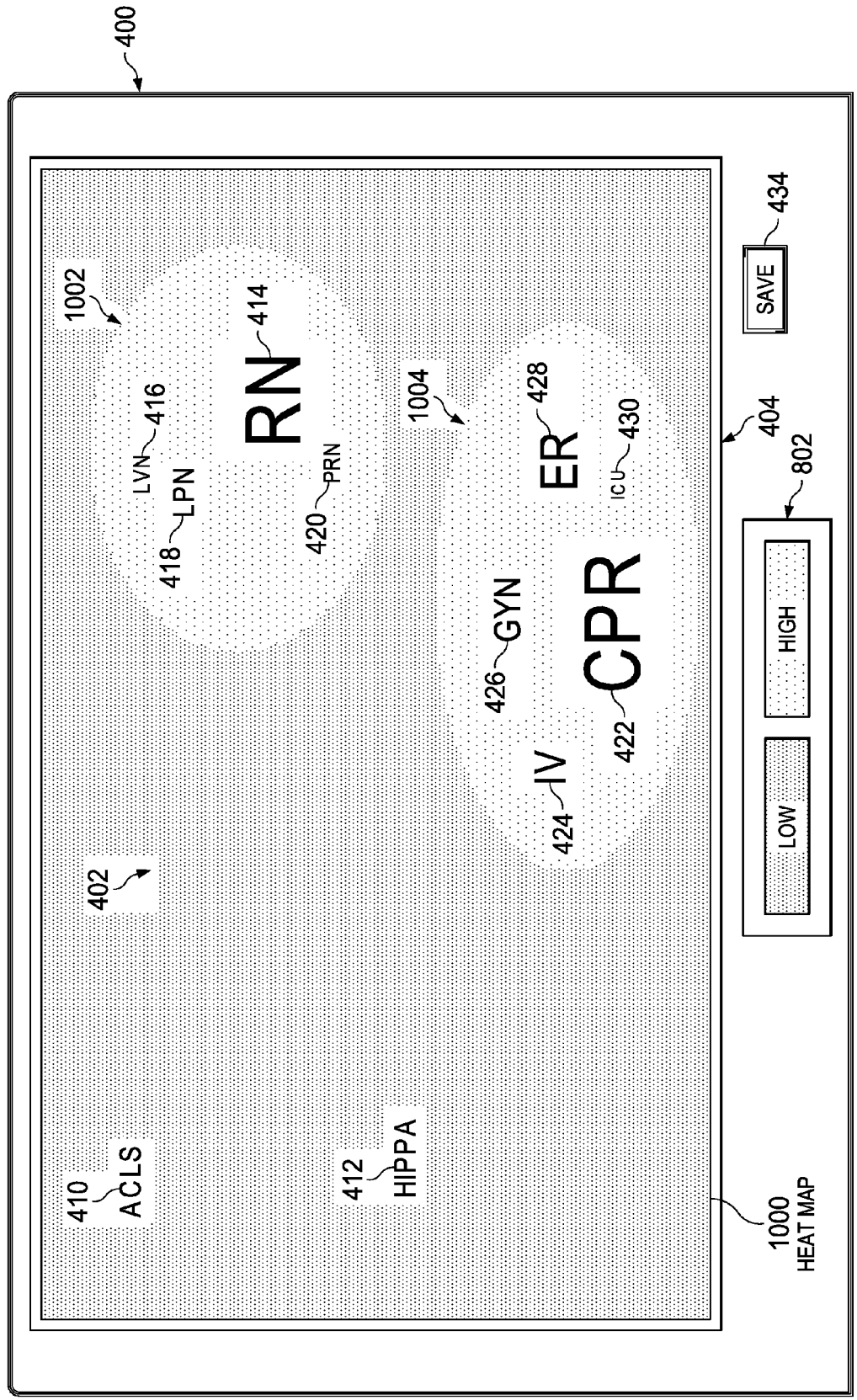
FIG. 10 is an illustration of a graphical user interface displaying a heat map for a word cloud in accordance with an illustrative embodiment.

Turning to FIG. 10, an illustration of a graphical user interface displaying a heat map for a word cloud is depicted in accordance with an illustrative embodiment. In this illustrative example, heat map 1000 is a graphical indicator of priority for an organization for different types of work experience for a person.

As depicted, heat map 1000 includes elliptical region 1002 and elliptical region 1004 for types of work experience having a high level of priority for the organization, and a rectangular region for types of work experience with a low level of priority. In this illustrative example, graphical user interface 400 has displayed words 402 of word cloud 404 on top of heat map 1000.

Figure 11:
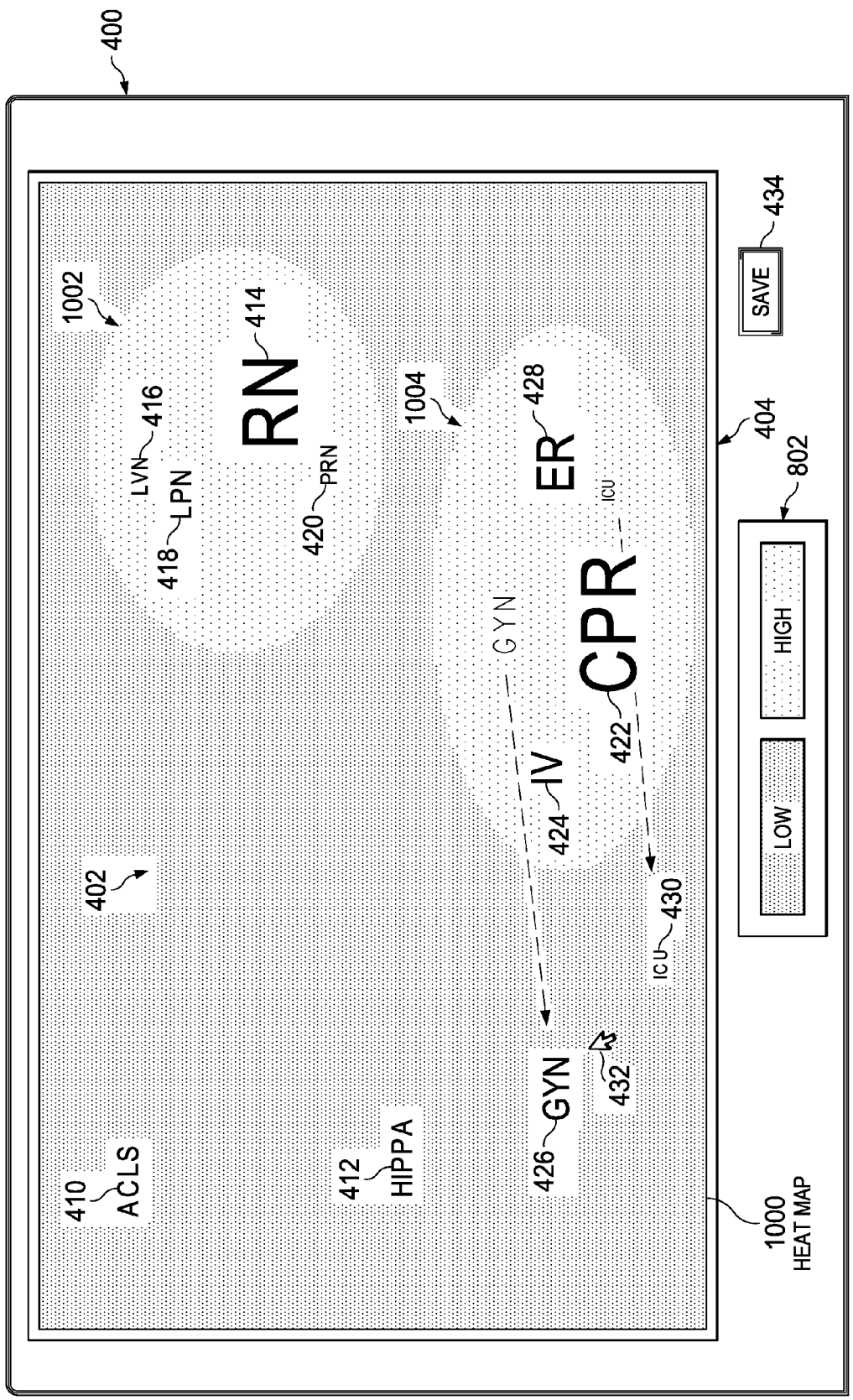
FIG. 11 is an illustration of a graphical user interface for modifying values of a metric for words in a word cloud in accordance with an illustrative embodiment.

With reference to FIG. 11, an illustration of a graphical user interface for modifying values of a metric for words in a word cloud is depicted in accordance with an illustrative embodiment. In this illustrative example, GYN 426 and ICU 430 make up a group of words selected by an operator using pointer 432.

As depicted, the locations of GYN 426 and ICU 430 on heat map 1000 indicate values for GYN 426 and ICU 430 for priority of an organization for GYN 426 and ICU 430. In particular, the locations of GYN 426 and ICU 430 on elliptical region 1004 of heat map 1000 indicate a high level of priority for the organization.

In this illustrative example, the operator has moved GYN 426 and ICU 430 as a group of selected words to a new location on heat map 1000 that is not in elliptical region 1004. As depicted, in moving the group of selected words to the new location on word cloud 404, the operator has changed the values for the group of selected words to a lower priority for the organization.

Figure 12:
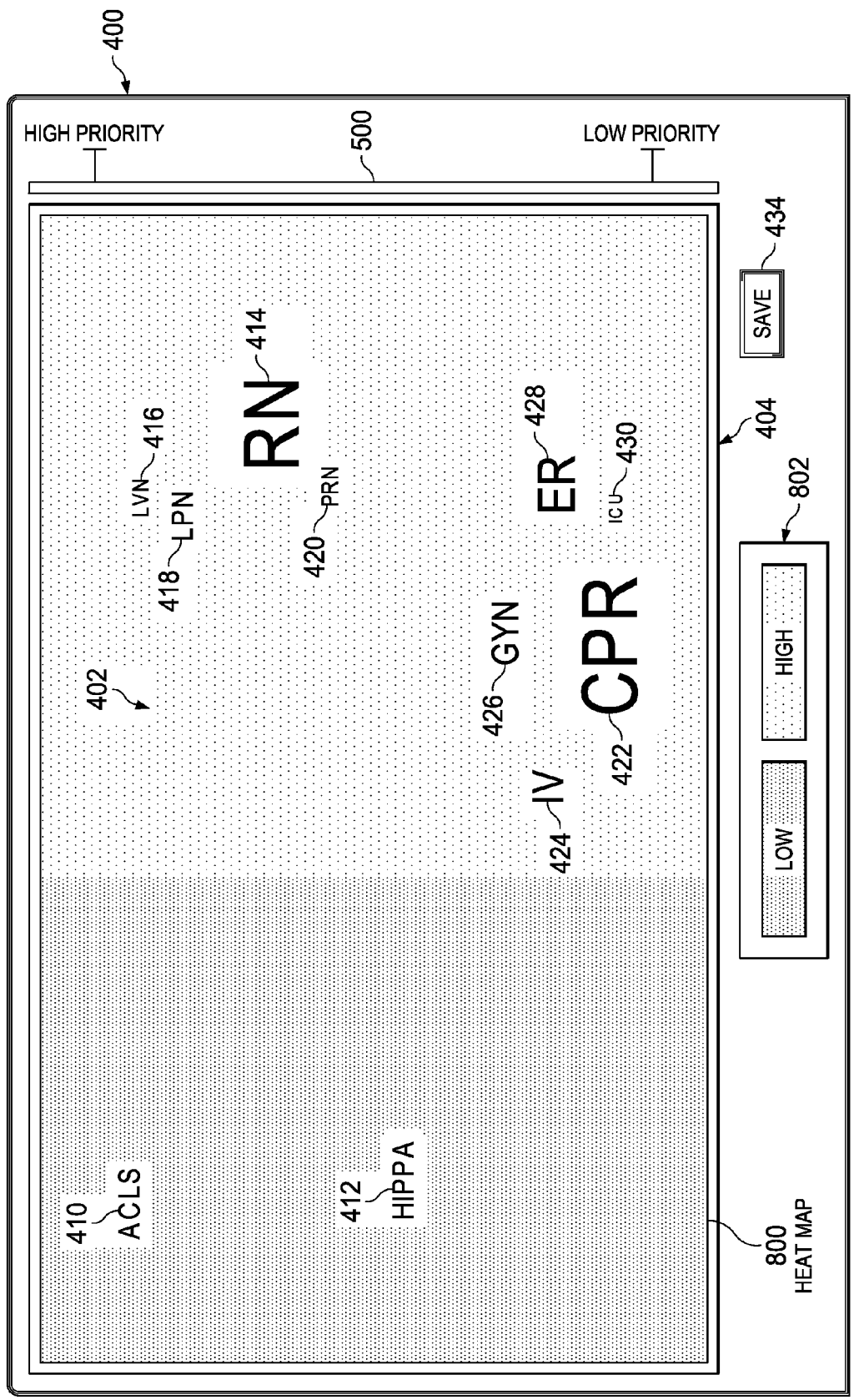
FIG. 12 is an illustration of a graphical user interface displaying metrics for a word cloud in accordance with an illustrative embodiment.

With reference next to FIG. 12, an illustration of a graphical user interface displaying metrics for a word cloud is depicted in accordance with an illustrative embodiment. In this illustrative example, heat map 800 and indicator 500 have been combined to show two different graphical indicators of priority for different types of work experience for a person. As described above, indicator 500 is a graphical representation of a metric for a priority of a particular organization.

As depicted, heat map 800 is an indicator of priority for a group of organizations. The particular organization is at least one of a member of the group of organizations or associated with the group of organizations. For example, the group of organizations may represent organizations of a particular type.

In this illustrative example, the locations for the different types of work experience represented by words 402 are based on both the priority of the group of organizations and the priority of the particular organization for the types of work experience represented by words 402. As depicted, the types of work experience in words 402 that have high priority values for the group of organizations are located in the high region of heat map 800 and the types of work experience in words 402 with low priority values for the group of organizations are located in the low region of heat map 800. In this illustrative example, the types of work experience in words 402 that have higher priority values for the particular organization are located above the types of work experience in words 402 with lower priority values for the particular organization.

Figure 13:
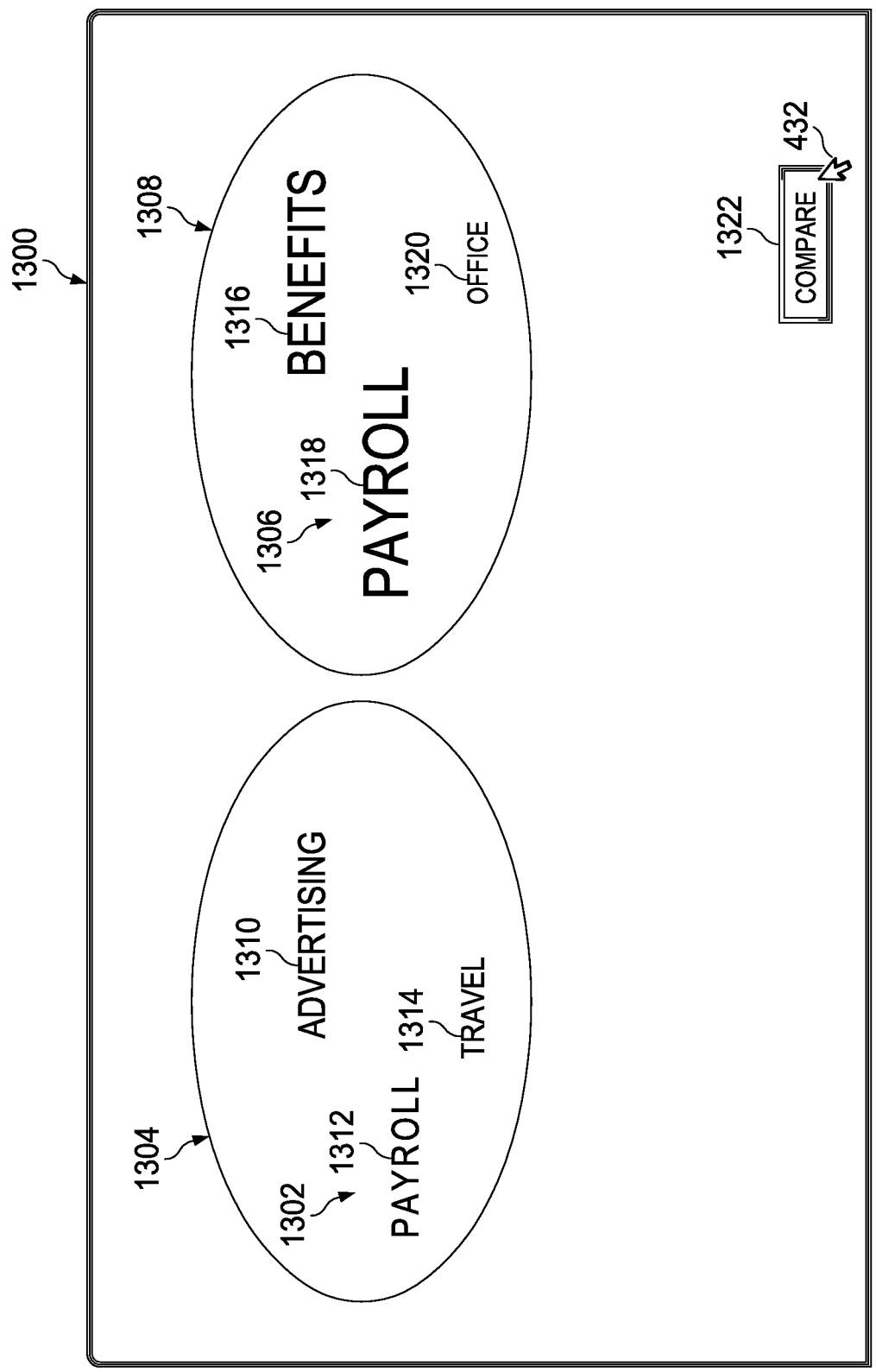
FIG. 13 is an illustration of a graphical user interface with word clouds in accordance with an illustrative embodiment.

With reference now to FIG. 13, an illustration of a graphical user interface with word clouds is depicted in accordance with an illustrative embodiment. Graphical user interface 1300 is an example of one implementation for graphical user interface 118 shown in block form in FIG. 1.

In this illustrative example, words 1302 are graphically displayed in word cloud 1304. Words 1306 are graphically displayed in word cloud 1308. In this illustrative example, words 1302 in word cloud 1304 represent different types of expenses of a group of traveling salesmen in an organization. Words 1306 in word cloud 1308 represent different types of expenses of a group of people in the home office of the organization.

Graphical features and locations of words 1302 in word cloud 1304 represent values for metrics for the different types of expenses. These values for metrics are for at least one of actual expense, desired expense, or potential expense. These values may be at least one of a measure of time for a type of expense, a level of efficiency for a type of expense, or other suitable types of values for a type of expense. These values may be at least one of self-identified, supervisor identified, test result identified, or identified through other suitable ways of identifying values for metrics for different types of expenses.

As depicted, words 1302 include advertising 1310, payroll 1312, and travel 1314. Words 1306 include benefits 1316, payroll 1318, and office 1320. In the illustrative example, selecting compare button 1322 causes a comparison of words 1302 in word cloud 1304 and words 1306 in word cloud 1308 to occur.

Figure 14:
FIG. 14 is an illustration of a graphical user interface with a word cloud in accordance with an illustrative embodiment.

With reference next to FIG. 14, an illustration of a graphical user interface with a word cloud is depicted in accordance with an illustrative embodiment. In this illustrative example, compare button 1322 has been selected.

As depicted, the background of payroll 1312 and payroll 1318 have been modified to show a background pattern for common words that is different than the background pattern of other words in words 1302 and words 1306. In this illustrative example, a dot pattern is used for the background of words common to both word cloud 1304 and word cloud 1308.

As another example, any other suitable type of graphical feature for words can be used to show which words are common between word clouds. Similarly, another suitable type of graphical feature for words can be used to show which words are different between word clouds. For example, the colors of words common to both word cloud 1304 and word cloud 1308 may be changed to one color, and the other words that are not common may be changed to another color. In this example, green may be used to show common words and red may be used to show words that are not common to both word cloud 1304 and word cloud 1308.

The illustration of information environment 100 in FIG. 1 and the different components in information environment 100 in FIGS. 1-3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

The illustration of the graphical user interfaces in FIGS. 4-14 are shown as examples of implementations for displaying word cloud 130 in graphical user interface 118 and are not meant as limitations to the manner in which other implementations for word cloud 130 may be displayed in graphical user interface 118. For example, one or more word clouds in addition to word cloud 404 may be displayed in graphical user interface 400. In another illustrative example, indicator 500 in FIG. 5 and indicator 602 in FIG. 6 may be omitted. In still another illustrative example, other types of graphical features other than the size of words may be used to indicate the different values for the different metrics. For example, the graphical feature may be color, grayscale, or some other suitable type of graphical feature.

Figure 15:
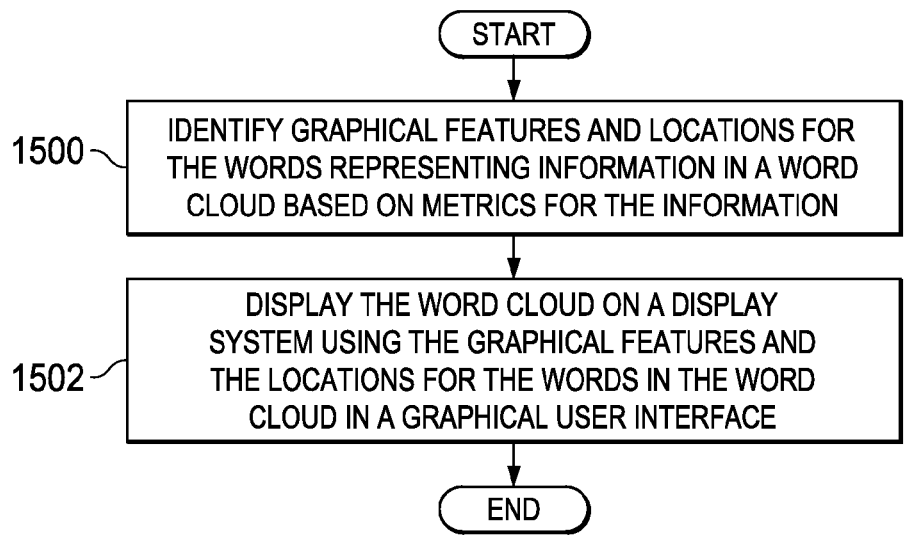
FIG. 15 is an illustration of a flowchart of a process for identifying a relative importance of words in a word cloud in accordance with an illustrative embodiment.

Turning next to FIG. 15, an illustration of a flowchart of a process for identifying a relative importance of words in a word cloud is depicted in accordance with an illustrative embodiment. The process illustrated in FIG. 15 may be implemented in information system 102 in FIG. 1. In particular, the different operations may be implemented in word cloud system 110 within computer system 114 in FIG. 1.

The process begins by identifying graphical features and locations for the words representing information in a word cloud based on metrics for the information (step 1500). The graphical features distinguish the words from each other based on a first number of first values for a first metric in a group of metrics, and the locations of the words distinguish the words from each other based on a second number of second values for a second metric in the group of metrics. In this illustrative example, a metric is a variable that has a value.

The process displays the word cloud on a display system using the graphical features and the locations for the words in the word cloud in a graphical user interface (step 1502), with the process terminating thereafter. The graphical user interface enables identifying the relative importance of the words with respect to each other in the word cloud based on the metrics for the information represented by the words. For example, with the process in FIG. 15, operator 122 in FIG. 1 may perform operations in managing organization 108. For example, operator 122 may perform human resource operations with respect to health benefits, financial planning operations, hiring operations, payroll operations, task assignments, project creations, movements of people 106 between departments, or other suitable operations. These different operations are real-world operations that may be used to manage the operation of organization 108.

In this manner, word cloud system 110 in computer system 114 using the process in FIG. 15 operates as a special purpose computer to provide a visualization of information 104 about people 106 in a manner that allows operator 122 to more easily analyze or comprehend information 104 in a manner that allows operator 122 to more efficiently perform operations with respect to organization 108.

Figure 16:
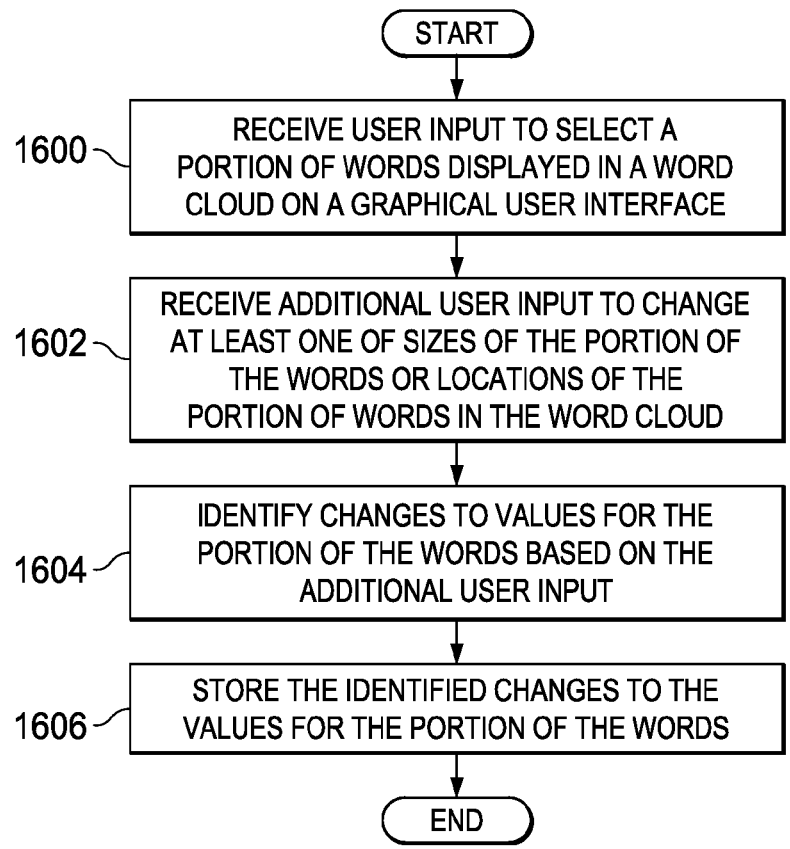
FIG. 16 is an illustration of a flowchart of a process for changing relative importance of words in accordance with an illustrative embodiment.

With reference now to FIG. 16, an illustration of a flowchart of a process for changing relative importance of words is depicted in accordance with an illustrative embodiment. The process illustrated in FIG. 16 may be implemented in information system 102 in FIG. 1. In particular, the different steps may be implemented in word cloud system 110 within computer system 114 in FIG. 1.

The process begins by receiving user input to select a portion of words displayed in a word cloud on a graphical user interface (step 1600). The sizes of the words distinguish the words from each other based on values for the words for a first metric in a group of metrics. The locations of the words displayed in the word cloud distinguish the words from each other based on values for the words for a second metric in the group of metrics.

The process receives additional user input to change at least one of sizes of the portion of the words or locations of the portion of the words in the word cloud (step 1602). The process identifies changes to values for the portion of the words based on the additional user input (step 1604).

The process then stores the identified changes to the values for the portion of the words (step 1606), with the process terminating thereafter. For example, the process may store the changed values in information 104 in FIG. 1. Processing the user input to the graphical user interface enables a desired level of user interaction for distinguishing the words from each other based on the values for the words for the group of metrics.

Figure 17:
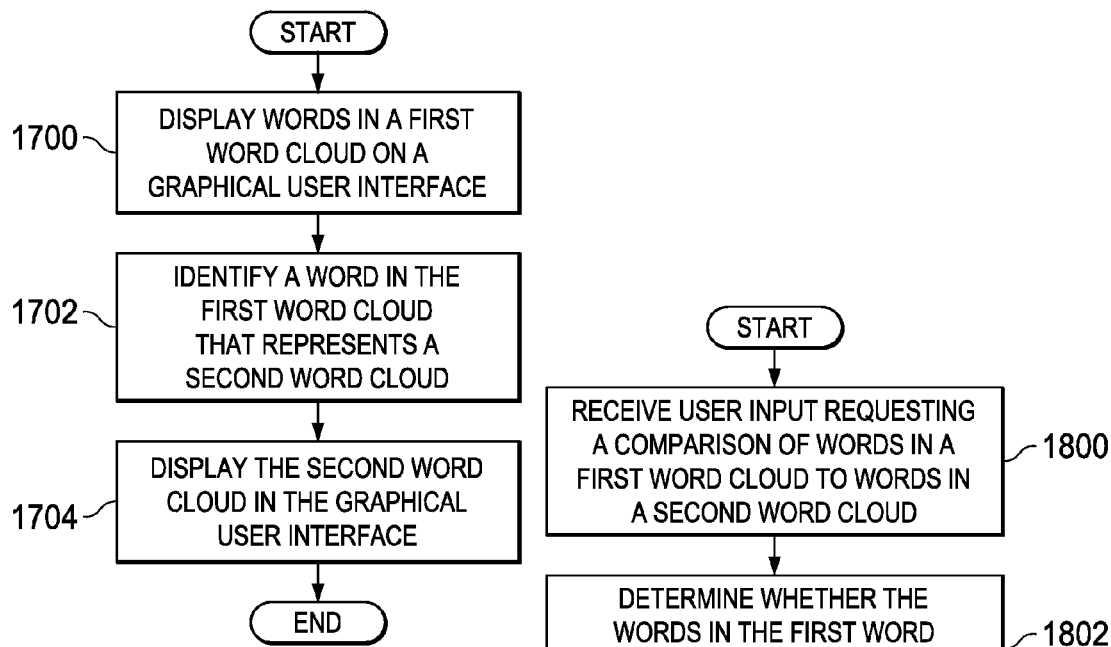
FIG. 17 is an illustration of a flowchart of a process for displaying words in words clouds in accordance with an illustrative embodiment.

With reference next to FIG. 17, an illustration of a flowchart of a process for displaying words in words clouds is depicted in accordance with an illustrative embodiment. The process illustrated in FIG. 17 may be implemented in information system 102 in FIG. 1. In particular, the different steps may be implemented in word cloud system 110 within computer system 114 in FIG. 1.

The process begins by displaying words in a first word cloud on a graphical user interface (step 1700). The process identifies a word in the first word cloud that represents a second word cloud (step 1702). The process then displays the second word cloud in the graphical user interface (step 1704), with the process terminating thereafter. Displaying the second word cloud in the graphical user interface enables a desired level of user interaction for distinguishing the words from each other based on a hierarchy of information.

Figure 18:
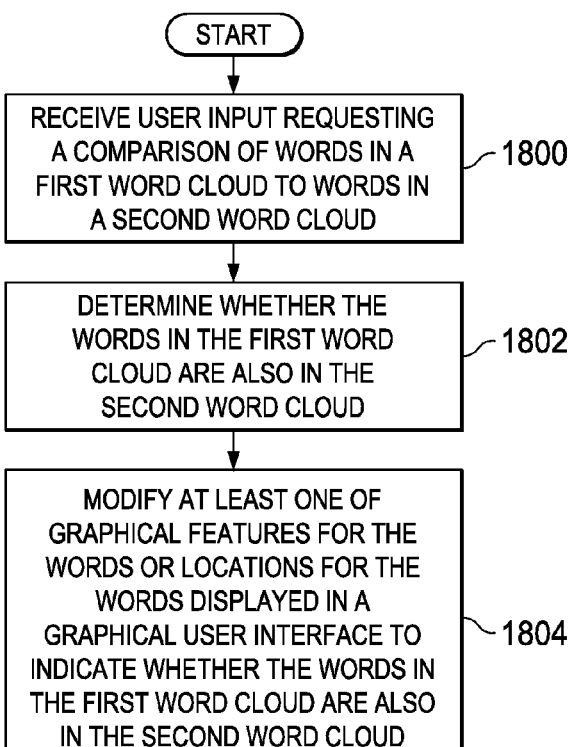
FIG. 18 is an illustration of a flowchart of a process for comparing words clouds in accordance with an illustrative embodiment.

With reference next to FIG. 18, an illustration of a flowchart of a process for comparing words clouds is depicted in accordance with an illustrative embodiment. The process illustrated in FIG. 18 may be implemented in information system 102 in FIG. 1. In particular, the different steps may be implemented in word cloud system 110 within computer system 114 in FIG. 1.

The process begins by receiving user input requesting a comparison of words in a first word cloud to words in a second word cloud (step 1800). The process determines whether the words in the first word cloud are also in the second word cloud (step 1802). The process then modifies at least one of graphical features for the words or locations for the words displayed in a graphical user interface to indicate whether the words in the first word cloud are also in the second word cloud (step 1804), with the process terminating thereafter. Modifying at least one of the graphical features for the words or the locations for the words displayed in the graphical user interface based on the comparison enables a desired level of user interaction for distinguishing the words in a plurality of word groups.

Figure 19:
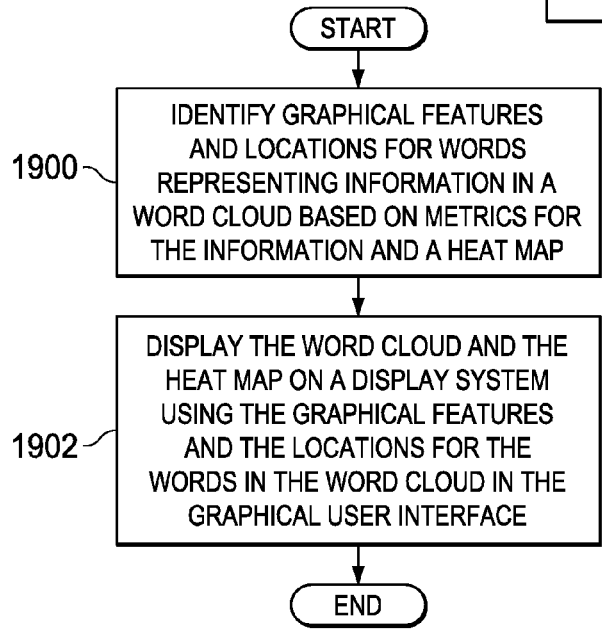
FIG. 19 is an illustration of a flowchart of a process for identifying a relative importance of words in a word cloud in accordance with an illustrative embodiment.

Turning next to FIG. 19, an illustration of a flowchart of a process for identifying a relative importance of words in a word cloud is depicted in accordance with an illustrative embodiment. The process illustrated in FIG. 19 may be implemented in information system 102 in FIG. 1. In particular, the different operations may be implemented in word cloud system 110 within computer system 114 in FIG. 1.

The process begins by identifying graphical features and locations for words representing information in a word cloud based on metrics for the information and a heat map (step 1900). The graphical features distinguish the words from each other based on a first number of first values for a first metric in the group of metrics. The locations of the words distinguish the words from each other based on a comparison of a second number of second values for a second metric in the group of metrics and a third number of third values for regions of the heat map.

The process displays the word cloud and the heat map on a display system using the graphical features and the locations for the words in the word cloud in the graphical user interface (step 1902), with the process terminating thereafter. The graphical user interface enables identifying the relative importance of the words with respect to each other in the word cloud based on the metrics for information represented by the words and the heat map.

With the processes illustrated in FIGS. 15-19, operator 122 in FIG. 1 may perform steps or tasks in managing organization 108 in FIG. 1. For example, operator 122 may perform human resource operations with respect to health benefits, financial planning operations, hiring operations, payroll operations, task assignments, project creations, movements of people 106 between departments, or other suitable operations. In this manner, word cloud system 110 in computer system 114 using the process in FIG. 15 operates as a special purpose computer to provide a visualization of information 104 about people 106 in a manner that allows operator 122 to more easily analyze or comprehend information 104 in a manner that allows operator 122 to more efficiently perform operations with respect to organization 108.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the processes are shown as terminating. The different steps in these processes may be repeated instead of ending as shown in in FIGS. 15-19. For example, the process in FIG. 16 may repeat any number of times to make any number of changes to the relative importance of words.

Some of the steps performed in the processes illustrated in FIGS. 15-19 may be omitted and others added. For example, step 1606 in the process in FIG. 16 can be omitted. In this example, the identified changes to the values for the portion of words are not stored by the process in FIG. 16. In this example, the storing step may be performed at a later time. For example, the storing step may be responsive to a user selecting save button 434 in FIG. 4 after a number of changes have been made to locations of the words.

As another example, after step 1702 in the process in FIG. 17 displays the second word cloud in the graphical user interface, the process may identify a word in the second word cloud that represents a third word cloud. In this example, the process may then display the third word cloud in the graphical user interface. As a further example, the steps in the process in FIG. 17 may be repeated until the process has displayed any word clouds represented by any words of the word clouds displayed in the graphical user interface.

Figure 20:
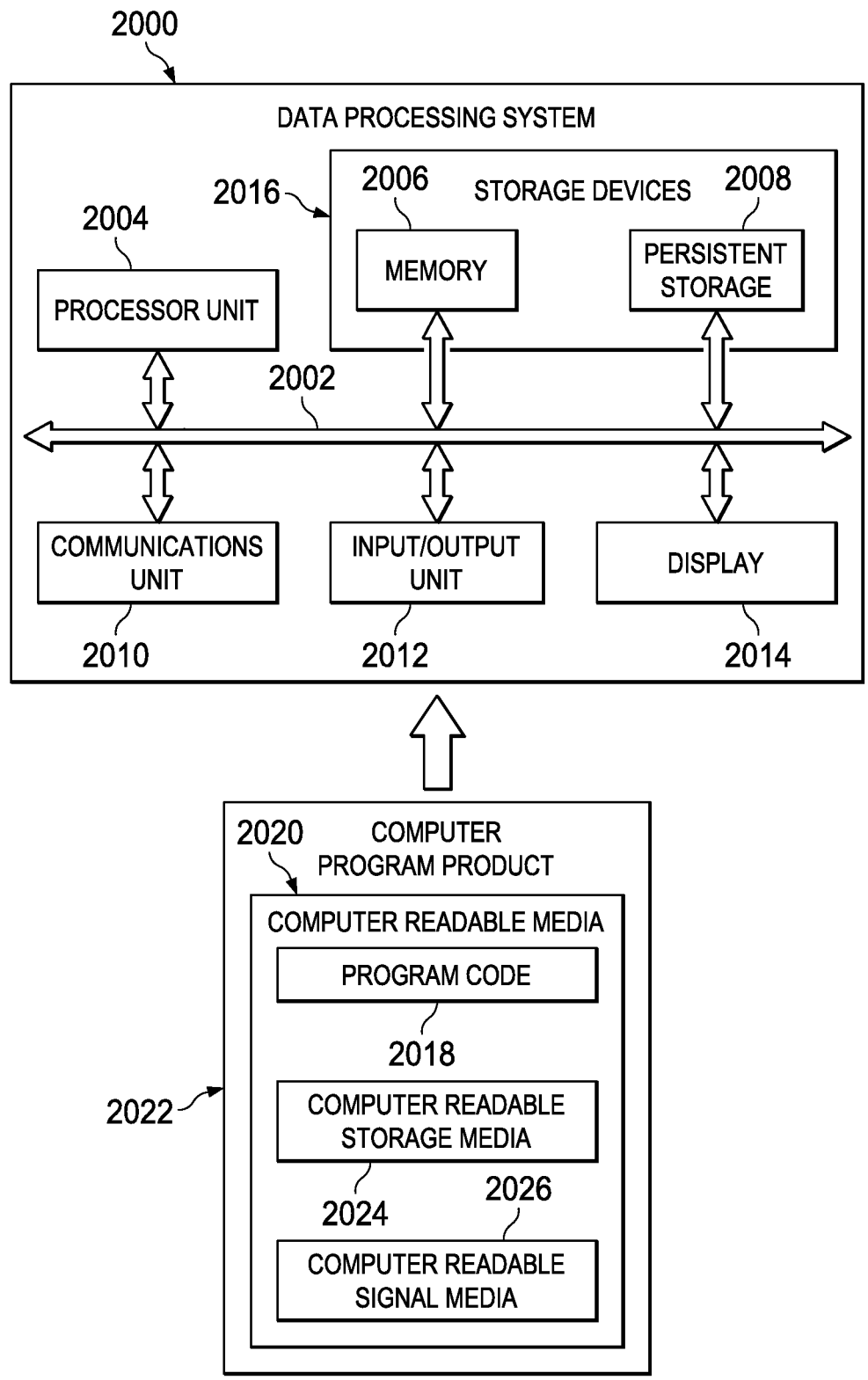
FIG. 20 is an illustration of a block diagram of a data processing system in accordance with an illustrative embodiment.

Turning now to FIG. 20, an illustration of a block diagram of a data processing system is depicted in accordance with an illustrative embodiment. Data processing system 2000 may be used to implement one or more computers in computer system 114 in FIG. 1. In this illustrative example, data processing system 2000 includes communications framework 2002, which provides communications between processor unit 2004, memory 2006, persistent storage 2008, communications unit 2010, input/output (I/O) unit 2012, and display 2014. In this example, communications framework 2002 may take the form of a bus system.

Processor unit 2004 serves to execute instructions for software that may be loaded into memory 2006. Processor unit 2004 may be a number of processors, a multi-processor core, or some other type of processor, depending on the particular implementation.

Memory 2006 and persistent storage 2008 are examples of storage devices 2016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2016 may also be referred to as computer readable storage devices in these illustrative examples. Memory 2006, in these examples, may be, for example, a random access memory or any other suitable volatile or non-volatile storage device. Persistent storage 2008 may take various forms, depending on the particular implementation.

For example, persistent storage 2008 may contain one or more components or devices. For example, persistent storage 2008 may be a hard drive, a flash memory, a rewritable optical disk, a rewritable magnetic tape, or some combination of the above. The media used by persistent storage 2008 also may be removable. For example, a removable hard drive may be used for persistent storage 2008.

Communications unit 2010, in these illustrative examples, provides for communications with other data processing systems or devices. In these illustrative examples, communications unit 2010 is a network interface card.

Input/output unit 2012 allows for input and output of data with other devices that may be connected to data processing system 2000. For example, input/output unit 2012 may provide a connection for user input through at least of a keyboard, a mouse, or some other suitable input device. Further, input/output unit 2012 may send output to a printer. Display 2014 provides a mechanism to display information to a user.

Instructions for at least one of the operating system, applications, or programs may be located in storage devices 2016, which are in communication with processor unit 2004 through communications framework 2002. The processes of the different embodiments may be performed by processor unit 2004 using computer-implemented instructions, which may be located in a memory, such as memory 2006.

These instructions are referred to as program code, computer usable program code, or computer readable program code that may be read and executed by a processor in processor unit 2004. The program code in the different embodiments may be embodied on different physical or computer readable storage media, such as memory 2006 or persistent storage 2008.

Program code 2018 is located in a functional form on computer readable media 2020 that is selectively removable and may be loaded onto or transferred to data processing system 2000 for execution by processor unit 2004. Program code 2018 and computer readable media 2020 form computer program product 2022 in these illustrative examples. In one example, computer readable media 2020 may be computer readable storage media 2024 or computer readable signal media 2026.

In these illustrative examples, computer readable storage media 2024 is a physical or tangible storage device used to store program code 2018 rather than a medium that propagates or transmits program code 2018.

Alternatively, program code 2018 may be transferred to data processing system 2000 using computer readable signal media 2026. Computer readable signal media 2026 may be, for example, a propagated data signal containing program code 2018. For example, computer readable signal media 2026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2000 are not meant to provide architectural limitations to the manner in which different embodiments may be implemented. The different illustrative embodiments may be implemented in a data processing system including components in addition to or in place of those illustrated for data processing system 2000. Other components shown in FIG. 20 can be varied from the illustrative examples shown. The different embodiments may be implemented using any hardware device or system capable of running program code 2018.

Thus, the illustrative embodiments provide a method and apparatus for accessing information. In particular, the process may be used to identify relative importance of words with respect to each other in a word cloud. In the illustrative examples, graphical features and locations are identified for words representing the information in a word cloud. The graphical features and locations are identified based on metrics for the information. The words are displayed using the graphical features and the locations in a word cloud in a graphical user interface displayed in a display system.

With the method and apparatus, an operator may perform various operations with respect to an organization. For example, operations may be identified, selected, managed, created, or otherwise performed using word cloud system 110 in FIG. 1.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying a relative importance of words in a word cloud, the method comprising:
   identifying, by a computer system, graphical features and locations for the words representing information in the word cloud based on a group of metrics for the information in which the graphical features distinguish the words from each other based on a first number of first values for a first metric in the group of metrics and the locations of the words distinguish the words from each other based on a second number of second values for a second metric in the group of metrics;
   displaying, by the computer system, the word cloud on a display system using the graphical features and the locations for the words in the word cloud in a graphical user interface, wherein the graphical user interface enables identifying the relative importance of the words in the word cloud based on the group of metrics for information represented by the words;
   receiving, by the computer system, a user input to change at least one of a graphical feature of the words or a location of a word in the word cloud, wherein the graphical features are sizes for the words;
   identifying, by the computer system, a change to a value of a metric in the group of metrics for the word based on the user input to change to at least one of a size and the location of the word in the word cloud in the user input; and storing, by the computer system, the change to the value of the metric for the word.

2. The method of claim 1, wherein the user input enables a desired level of user interaction for distinguishing the words from each other based on values for the group of metrics for the words.

3. The method of claim 2, wherein the graphical features are sizes for the words and further comprising:
changing, by the computer system, a size of the word when the user input changes a value for the word for a metric in the group of metrics represented by the sizes.

4. The method of claim 1, wherein the user input includes a selection of a portion of the words in the word cloud, and wherein the portion of the words includes the word, and further comprising:
identifying, by the computer system, the change to the portion of the words based on the change to the value of the metric for the word when the change to the value of the metric for the word is identified.

5. The method of claim 1, wherein the word cloud is a first word cloud and further comprising:
displaying, by the computer system, a second word cloud when a word in the first word cloud represents the second word cloud.

6. The method of claim 1, wherein the word cloud is a first word cloud and further comprising:
determining, by the computer system, whether the words in the first word cloud are also in a second word cloud; and
modifying, by the computer system, at least one of the graphical features for the words or the locations for the words to indicate whether the words in the first word cloud are also in the second word cloud.

7. The method of claim 1, wherein the identifying step comprises:
comparing, by the computer system, a third number of third values for regions in a heat map with the second number of the second values for the second metric in the group of metrics to form a comparison; and
identifying the locations for the words in the word cloud based on the comparison.

8. The method of claim 1, wherein the words in the word cloud are at least one of types of work experience or types of expenses.

9. The method of claim 1, wherein the graphical features are selected from at least one of a size, a color, or a font.

10. A computer system comprising:
a display system;
a hardware processor; and
a word cloud system in communication with the display system and the hardware processor, wherein the word cloud system identifies graphical features and locations for words representing information in a word cloud based on a group of metrics for the information in which the graphical features distinguish the words from each other based on a first number of first values for a first metric in the group of metrics and the locations of the words distinguish the words from each other based on a second number of second values for a second metric in the group of metrics; displays the word cloud on the display system using the graphical features and the locations for the words in the word cloud in a graphical user interface, wherein the graphical features are sizes for the words; identifies a change to a value of a metric for the word based on the user input to change at least one of a size and the location of the word in the word cloud in the user input; and stores the change to the value of the metric for the word, wherein the graphical user interface enables identifying a relative importance of the words in the word cloud based on the group of metrics for the information represented by the words.

11. The computer system of claim 10, wherein the word cloud system receives a user input to change at least one of a graphical feature of a word or a location of the word in the word cloud, wherein the user input enables a desired level of user interaction for distinguishing the words from each other based on values for the group of metrics for the words.

12. The computer system of claim 11, wherein the graphical features are sizes for the words and the word cloud system changes a size of the word when the user input changes a value for the word for a metric represented by the sizes.

13. The computer system of claim 10, wherein the user input includes a selection of a portion of the words in the word cloud, and wherein the portion of the words includes the word, and the word cloud system identifies the change to the portion of the words based on the change to the value of the metric for the word when the change to the value of the metric for the word is identified.

14. The computer system of claim 10, wherein the word cloud is a first word cloud and the word cloud system displays a second word cloud when a word in the first word cloud represents the second word cloud.

15. The computer system of claim 10, wherein the word cloud is a first word cloud and further comprising:
comparing, by the computer system, a third number of third values for regions in a heat map with the second number of the second values for the second metric in the group of metrics to form a comparison; and
identifying the locations for the words in the word cloud based on the comparison.

16. The computer system of claim 10, wherein in identifying the locations for the words, the word cloud system compares a third number of third values for regions in a heat map with the second number of the second values for the second metric in the group of metrics to form a comparison, and identifies the locations for the words in the word cloud based on the comparison.

17. The computer system of claim 10, wherein the words in the word cloud are at least one of types of work experience or types of expenses.

18. The computer system of claim 10, wherein the graphical features are selected from at least one of a size, a color, or a font.

19. A computer program product for identifying a relative importance of words in a word cloud, the computer program product comprising:
a computer readable storage media;
first program code, stored on the computer readable storage media, for identifying graphical features and locations for the words representing information in the word cloud based on a group of metrics for the information in which the graphical features distinguish the words from each other based on a first number of first values for a first metric in the group of metrics and the locations of the words distinguish the words from each other based on a second number of second values for a second metric in the group of metrics;
second program code, stored on the computer readable storage media, for displaying the word cloud on a display system using the graphical features and the locations for the words in the word cloud in a graphical user interface, wherein the graphical user interface enables identifying the relative importance of the words in the word cloud based on the group of metrics for the information represented by the words;

third program code, stored on the computer readable storage media, for receiving a user input to change at least one of a graphical feature of the words or a location of a word in the word cloud, wherein the graphical features are sizes for the words, wherein the user input changes at least one of a size and the location of the word enables a desired level of user interaction for distinguishing the words from each other based on values for the group of metrics for the words;

fourth program code, stored on the computer readable storage media, for identifying a change to a value of a metric in the group of metrics for the word based on the user input to change at least one of the size and the location of the word in the word cloud in the user input; and fifth program code, stored on the computer readable storage media, for storing the change to the value of the metric for the word.

20. The computer program product of claim 19, wherein the graphical features are sizes for the words and further comprising:
   program code, stored on the computer readable storage media, for changing the size of the word when the user input changes a value for the word for a metric in the group of metrics represented by the sizes.

21. The computer program product of claim 19, wherein the user input includes a selection of a portion of the words in the word cloud, and wherein the portion of the words includes the word, and further comprising:
   sixth program code, stored on the computer readable storage media, for identifying the change to the portion of the words based on the change to the value of the metric for the word when the change to the value of the metric for the word is identified.

* * * * *